(12) United States Patent
Miyamae et al.

(10) Patent No.: US 11,177,481 B2
(45) Date of Patent: Nov. 16, 2021

(54) LITHIUM SECONDARY BATTERY INCLUDING NONAQUEOUS ELECTROLYTE HAVING LITHIUM-ION CONDUCTIVITY

(71) Applicant: Panasonic Intellectual Property Management Co., Ltd., Osaka (JP)

(72) Inventors: Ryohei Miyamae, Osaka (JP); Akira Kano, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 365 days.

(21) Appl. No.: 16/392,573

(22) Filed: Apr. 23, 2019

(65) Prior Publication Data

US 2019/0372125 A1  Dec. 5, 2019

(30) Foreign Application Priority Data

May 31, 2018  (JP) .............................. JP2018-105698

(51) Int. Cl.
  *H01M 4/70*  (2006.01)
  *H01M 4/66*  (2006.01)
  (Continued)

(52) U.S. Cl.
  CPC ............. *H01M 4/70* (2013.01); *H01M 4/668* (2013.01); *H01M 10/052* (2013.01);
  (Continued)

(58) Field of Classification Search
  CPC ...... H01M 4/70; H01M 4/668; H01M 10/052; H01M 2004/021; H01M 2004/025;
  (Continued)

(56) References Cited

U.S. PATENT DOCUMENTS

2006/0110661 A1  5/2006  Lee et al.
2011/0020536 A1*  1/2011  Yamamoto ............ H01M 4/139
                                                    427/126.3
(Continued)

FOREIGN PATENT DOCUMENTS

EP          3404756 A1     11/2018
JP        2001-243957       9/2001
(Continued)

OTHER PUBLICATIONS

The Extended European Search Report dated Jun. 24, 2019 for the related European Patent Application No. 19169696.2.

*Primary Examiner* — Gary D Harris
(74) *Attorney, Agent, or Firm* — McDermott Will and Emery LLP

(57) ABSTRACT

A lithium secondary battery includes a positive electrode, negative electrode, a separator, and a nonaqueous electrolyte having lithium-ion conductivity. The positive electrode contains a positive electrode active material containing lithium. The negative electrode faces the positive electrode. The separator is disposed between the positive and negative electrodes. The negative electrode includes a negative electrode current collector. The negative electrode current collector includes a layer having a first surface, and protrusions protruding from the first surface. The first surface is a surface on which lithium metal is deposited during charge. The protrusions do not divide the first surface into parts.

6 Claims, 12 Drawing Sheets

(51) Int. Cl.
*H01M 10/052* (2010.01)
*H01M 4/02* (2006.01)

(52) U.S. Cl.
CPC .......................... *H01M 2004/021* (2013.01); *H01M 2004/025* (2013.01); *H01M 2004/027* (2013.01)

(58) Field of Classification Search
CPC ....... H01M 2004/027; H01M 10/0422; H01M 10/0431; H01M 10/0587; H01M 2220/20; H01M 2220/30; H01M 2300/002; H01M 2300/0025; H01M 4/667; H01M 4/382; H01M 10/0525; H01M 4/78; Y02E 60/10
USPC ........................................................ 429/199
See application file for complete search history.

(56) References Cited

U.S. PATENT DOCUMENTS

| | | | |
|---|---|---|---|
| 2014/0099539 A1 | 4/2014 | Yamazaki et al. | |
| 2015/0280212 A1 | 10/2015 | Son et al. | |
| 2016/0226070 A1 | 8/2016 | Lopatin et al. | |

FOREIGN PATENT DOCUMENTS

| | | |
|---|---|---|
| JP | 2006-156351 A | 6/2006 |
| JP | 2016-527680 | 9/2016 |

* cited by examiner

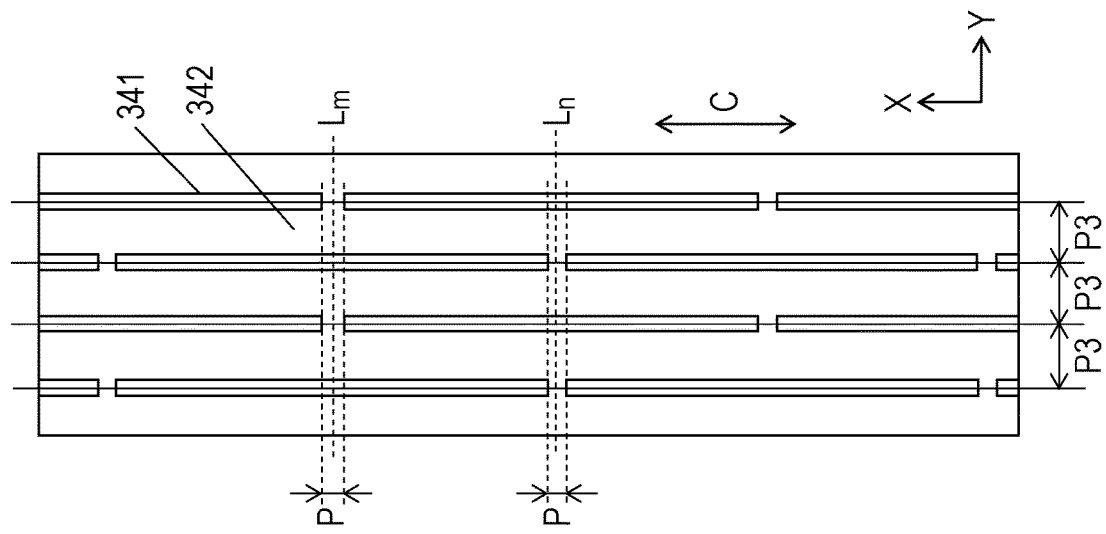
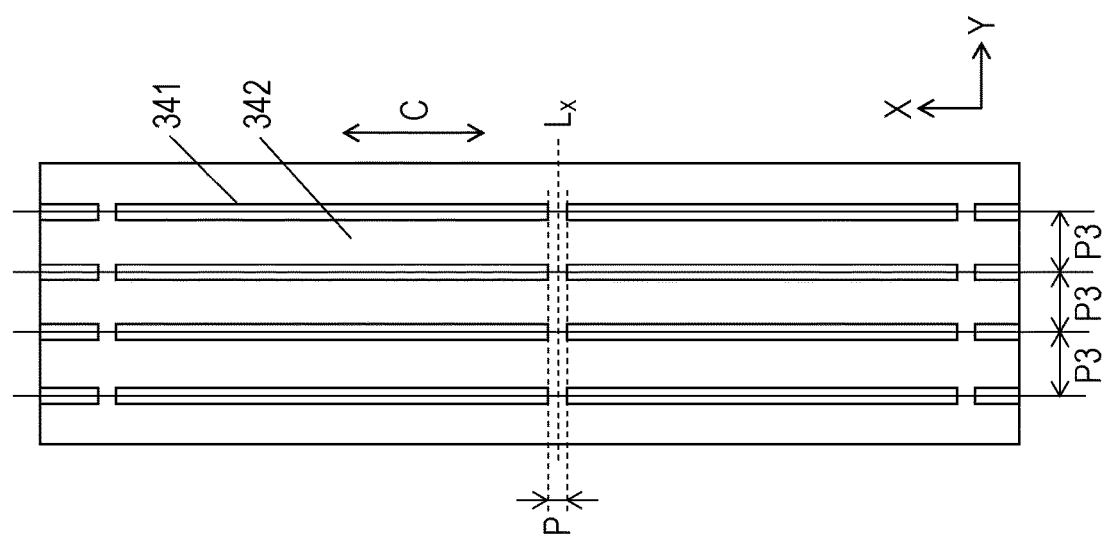

LITHIUM SECONDARY BATTERY INCLUDING NONAQUEOUS ELECTROLYTE HAVING LITHIUM-ION CONDUCTIVITY

BACKGROUND

1. Technical Field

The present disclosure relates to a lithium secondary battery that includes a nonaqueous electrolyte having lithium-ion conductivity.

2. Description of the Related Art

Nonaqueous electrolyte secondary batteries have been used in the information and communications technologies (ICT), such as personal computers and smartphones, and for automotive use, power storage use, and the like. There has been a demand for a further increase in the capacities of nonaqueous electrolyte secondary batteries used in these applications. Known examples of high-capacity nonaqueous electrolyte secondary batteries include lithium ion batteries. Although it is possible to increase the capacity of a lithium ion battery by using, for example, graphite in combination with an alloy active material, such as a silicon compound, as a negative electrode active material of the lithium ion battery, the increases in the capacities of lithium ion batteries appear to be reaching their limits.

Lithium metal secondary batteries (hereinafter, referred to as "lithium secondary batteries") have the potential to serve as a nonaqueous electrolyte secondary battery having a higher capacity than lithium ion batteries. In a lithium secondary battery, lithium metal is deposited on a negative electrode during charge, while the lithium metal dissolves in a nonaqueous electrolyte during discharge.

There have been attempts to improve the shape and the like of a negative electrode current collector included in a lithium secondary battery in order to limit the degradation of the properties of the battery which may be caused by dendritic deposition of lithium metal on the negative electrode. For example, in Japanese Unexamined Patent Application Publication No. 2001-243957, the ten-point average roughness Rz of the surface of the negative electrode current collector on which lithium metal is to be deposited is limited to be 10 μm or less. The lithium secondary battery proposed in Japanese Unexamined Patent Application Publication (Translation of PCT Application) No. 2016-527680 includes a negative electrode including a porous metal current collector and lithium metal intercalated in the pores of the current collector.

SUMMARY

One non-limiting and exemplary embodiment provides a lithium secondary battery capable of reducing the expansion of a negative electrode which may be caused by lithium metal deposited on the electrode during charge.

In one general aspect, the techniques disclosed here feature a lithium secondary battery that includes a positive electrode, negative electrode, a separator, and a nonaqueous electrolyte having lithium-ion conductivity. The positive electrode contains a positive electrode active material containing lithium. The negative electrode faces the positive electrode. The separator is disposed between the positive and negative electrodes. The negative electrode includes a negative electrode current collector. The negative electrode current collector includes a layer having a first surface, and protrusions protruding from the first surface. The first surface is a surface on which lithium metal is deposited during charge. The protrusions do not divide the first surface into parts.

The lithium secondary battery according to an embodiment of the present disclosure may reduce the expansion of a negative electrode which may be caused by lithium metal deposited on the electrode during charge. Consequently, the lithium secondary battery according to the present disclosure may have an improved discharge capacity and improved safety.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 8 is a schematic top plan view of a negative electrode current collector according to yet another embodiment of the present disclosure;

FIG. 9 is a schematic top plan view of a negative electrode current collector according to still another embodiment of the present disclosure;

DETAILED DESCRIPTION

Figure 1:
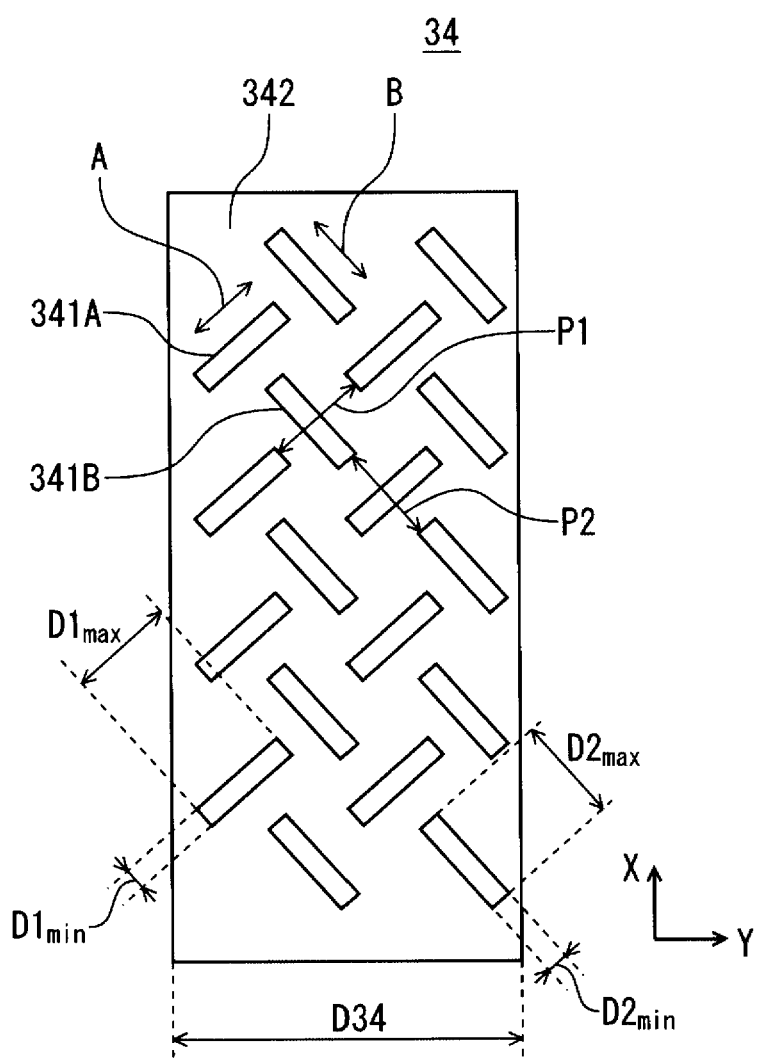
FIG. 1 is a schematic top plan view of a negative electrode current collector according to an embodiment of the present disclosure.

Underlying Knowledge Forming Basis of the Present Disclosure

The embodiments disclosed herein relate to a lithium secondary battery that includes lithium metal used as a negative electrode active material and specifically to improvement of a negative electrode current collector. While a lithium secondary battery is charged, lithium metal may be deposited on the negative electrode in a dendritic pattern. The formation of the dendrites results in an increase in the specific surface area of the negative electrode, which may lead to an increase in the occurrence of side reactions. As a result, the discharge capacity and cycle characteristic of a lithium secondary battery are likely to become degraded. In this regard, it is suggested in Japanese Unexamined Patent Application Publication No. 2001-243957 that setting the ten-point average roughness Rz of the lithium deposition surface of the negative electrode to be 10 μm or less may reduce formation of the dendrites and enable a high charge/discharge efficiency.

The negative electrode of a lithium secondary battery is particularly likely to significantly expand as a result of lithium metal deposited on the negative electrode during charge. Note that, the expression "expansion of the negative electrode" used herein means an increase in the total volume of the negative electrode and lithium metal deposited on the negative electrode. The expansion of the negative electrode becomes particularly significant in the case where lithium metal is deposited on the negative electrode in a dendritic pattern. In order to absorb the expansion of the negative electrode which may occur during charge and discharge, for example, a porous negative electrode current collector that is composed of copper or nickel and has a porosity of 50% to 99% and a pore size of 5 to 500 μm is used in Japanese Unexamined Patent Application Publication (Translation of PCT Application) No. 2016-527680.

As described above, it is advantageous that the surface of a negative electrode current collector be flat in order to enhance the charge/discharge efficiency. In the case where a porous negative electrode current collector as described in Japanese Unexamined Patent Application Publication (Translation of PCT Application) No. 2016-527680 is used, it becomes difficult to achieve a high charge/discharge efficiency because, during charge, lithium metal is deposited in the pores formed in the porous negative electrode current collector. The lithium metal deposited inside the pores is not pressed by a separator included in a secondary battery at a sufficiently high pressure and is likely to detach from the negative electrode current collector. The lithium metal detached from the negative electrode current collector is not able to dissolve in an electrolyte during discharge, which results in a reduction in charge/discharge efficiency. On the other hand, in order to reduce the change in the volume of the electrode, it is advantageous that the surface of the negative electrode current collector be not flat. Thus, it is difficult to enhance the charge/discharge efficiency while reducing the change in the volume of the electrode.

The inventors of the present invention conducted extensive studies in order to address the above issues and, as a result, conceived the lithium secondary battery according to the present disclosure. A lithium secondary battery according to an embodiment of the present disclosure includes a positive electrode containing a positive electrode active material containing lithium; a negative electrode facing the positive electrode; a separator disposed between the positive and negative electrodes; and a nonaqueous electrolyte having lithium-ion conductivity. The negative electrode includes a negative electrode current collector that includes a first surface on which lithium metal is deposited during charge. The negative electrode current collector includes protrusions protruding from the first surface. Each of the protrusions is long rectangular.

In the lithium secondary battery according to the embodiment of the present disclosure, the protrusions protruding from the first surface of the negative electrode current collector enable spaces in which lithium metal may be deposited to be created in the vicinity of the first surface. This may reduce the change in the volume of the negative electrode which is caused by deposition of the lithium metal. In addition, even in the case where lithium metal is deposited in a dendritic pattern, the dendrites may be accommodated in the spaces created in the vicinity of the first surface.

In the case where a negative electrode current collector includes protrusions formed thereon, the protrusions may block the movement of a nonaqueous electrolyte inside a battery. In a lithium secondary battery, a nonaqueous electrolyte forced out of the spaces as a result of lithium metal deposited in the spaces during charge needs to return to the spaces that are again created as a result of the lithium metal dissolving in the nonaqueous electrolyte during discharge. If the movement of a nonaqueous electrolyte on the surface of a negative electrode current collector is blocked, the nonaqueous electrolyte may be distributed in an uneven manner. In such a case, the amount of nonaqueous electrolyte may become insufficient in some portions of the electrode and, consequently, lithium metal may be deposited in a nonuniform manner. This may cause current crowding and increase the occurrence of excessive expansion of the negative electrode and the likelihood of a reduction in charge/discharge efficiency.

Accordingly, in the present disclosure, each of the protrusions is formed in a long-rectangular shape and the maximum width of each of the protrusions is set to be smaller than the minimum width of the negative electrode current collector. That is, any of the protrusions does not connect opposite outer edges of the negative electrode current collector to each other. This reduces the likelihood of the protrusions blocking the movement of a nonaqueous electrolyte and limits the uneven distribution of the nonaqueous electrolyte. Consequently, the occurrence of excessive expansion and a reduction in charge/discharge efficiency in a lithium secondary battery may be limited and the cycle characteristic and safety of the lithium secondary battery may be enhanced.

The term "long-rectangular shape" used herein refers to a shape of a protrusion such that the ratio of the length LL of the long side of a minimum rectangle that surrounds a projection of the protrusion on the first surface to the length SL of the short side of the rectangle (LL/SL) is 2 or more. The protrusions may consist of a straight line, a curve, or a combination of a straight line and a curve.

The projection of a protrusion on the first surface is, specifically, a figure formed by projecting the protrusion onto the first surface in the thickness direction of the negative electrode current collector.

The protrusions may be arranged not to divide the first surface into parts. Specifically, any of the protrusions does not divide the first surface into separated parts, and even when two or more of the protrusions are joined to one another, the joined protrusions do not divide the first surface into separated parts.

When the first surface is not divided into parts by any of the protrusions, any of the protrusions does not connect opposite outer edges of the negative electrode current collector. When the first surface is not divided into parts by any of the protrusions, a virtual line (specifically, a straight line, a curve, or a combination of a straight line and a curve) that connects a point located on an outer edge of the negative electrode current collector to an opposite point without passing through any of the protrusions can be drawn in the first surface.

The term "opposite point" used herein refers to a point located on another outer edge of the negative electrode current collector which is the symmetric of the point located on an outer edge of the negative electrode current collector with respect to the center point of the negative electrode current collector or a point located on another outer edge of the negative electrode current collector which is the symmetric of the point located on the outer edge with respect to a center line that passes the center point of the first surface.

When the first surface is not divided into parts by any of the protrusions, furthermore, a virtual line (specifically, a straight line, a curve, or a combination of a straight line and a curve) that connects any two points located on outer edges of the negative electrode current collector to each other without passing through any of the protrusions can also be drawn in the first surface. Note that, in the case where any of the protrusions is in contact with an outer edge of the negative electrode current collector, the "points located on the outer edges" are located in portions of the negative electrode current collector other than the portion at which the protrusion is in contact with the outer edge.

The protrusions may be arranged on the first surface in a regular pattern or in a repeated pattern. In such a case, the uneven distribution of the nonaqueous electrolyte may be further limited.

The longitudinal direction of each of the protrusions is not necessarily the same. For example, the protrusions include at least one long-rectangular first protrusion and at least one long-rectangular second protrusion, and the longitudinal direction (hereinafter, referred to as "first longitudinal direction") of the first protrusion may intersect the longitudinal direction (hereinafter, referred to as "second longitudinal direction") of the second protrusion. In such a case, the uneven distribution of the nonaqueous electrolyte may be further limited. The protrusions may further include at least one third protrusion having a longitudinal direction other than the first or second longitudinal direction.

The expression "a direction or straight line intersects another direction or straight line" used herein means that the acute angle formed by the direction or straight line and the other direction or straight line is larger than 30° or the angle formed by the direction or straight line and the other direction or straight line is 90°. Specifically, the expression "the first longitudinal direction intersects the second longitudinal direction" used herein means that the acute angle formed by the first and second longitudinal directions is larger than 30° or the angle formed by the first and second longitudinal directions is 90°. The above acute angle may be 45° or more, 60° or more, or 80° or more. The longitudinal direction of a protrusion is the direction of a straight line that passes through the centers of the short sides of a minimum rectangle that surrounds the projection of the protrusion.

The protrusions may include long-rectangular first protrusions and long-rectangular second protrusions. The longitudinal direction of each of the first protrusions may extend in a first direction. The longitudinal direction of each of the second protrusions may extend in a second direction that intersects the first direction.

The first protrusions may be joined to the second protrusions. Alternatively, virtual first protrusions formed by extending the first protrusions in the first longitudinal direction may be joined to virtual second protrusions formed by extending the second protrusions in the second longitudinal direction, on the first surface. The virtual first protrusions may be joined to the virtual second protrusions outside the first surface. The first protrusions may be joined to the virtual second protrusions on the first surface.

In the case where the protrusions include first protrusions and second protrusions, on the first surface, each adjacent two of the first protrusions may be separated at a certain distance, and each adjacent two of the second protrusions may be separated at a certain distance. Note that, the expression "on the first surface" used herein refers to the case where the protrusions are projected onto the first surface in the thickness direction of the negative electrode current collector.

The minimum clearance P1 between each adjacent two of the first protrusions may be larger than the minimum width $D1_{min}$ of the two adjacent first protrusions. Similarly, the minimum clearance P2 between each adjacent two of the second protrusions may be larger than the minimum width $D2_{min}$ of the two adjacent second protrusions. In such a case, the uneven distribution of the nonaqueous electrolyte may be further limited. Furthermore, spaces having a volume adequate to accommodate the deposited lithium metal may be readily created.

The minimum clearance P1 between adjacent two of the first protrusions is the minimum distance between an outer edge of one of the two adjacent first protrusions and an outer edge of the other first protrusion which is measured in a projection of the first protrusions on the first surface in the thickness direction of the negative electrode current collector. The minimum width $D1_{min}$ of two adjacent first protrusions is the minimum width of the two first protrusions which is measured in a projection of the two adjacent first protrusions on the first surface. Similarly, the minimum clearance P2 between adjacent two of the second protrusions is the minimum distance between an outer edge of one of the two adjacent second protrusions and an outer edge of the other second protrusion which is measured in a projection of the second protrusions on the second surface in the thickness direction of the negative electrode current collector. The minimum width $D2_{min}$ of two adjacent second protrusions is the minimum width of the two second protrusions which is measured in a projection of the two adjacent second protrusions on the second surface. Hereinafter, the first and second protrusions are collectively referred to simply as "protrusions".

In the case where, on the first surface, at least two of the protrusions have the same longitudinal direction, such protrusions may be arranged at a distance P on a virtual line L that extends in the longitudinal direction of the at least two protrusions. In such a case, the uneven distribution of the nonaqueous electrolyte may be limited.

The expression "a direction or straight line extends in another direction or along another straight line" used herein means that the direction or straight line is parallel to the other direction or straight line, or the acute angle formed by the direction or straight line and the other direction or straight line is 30° or less. Specifically, the expression "a straight line L extends in the longitudinal direction of protrusions" used herein means that, on the first surface, the straight line L and the longitudinal direction of the protrusions are parallel to each other or the acute angle formed by the straight line L and the longitudinal direction of the protrusions is 30° or less. The straight line L is, for example, an approximate straight line that passes through the centers of at least two protrusions on the first surface. The distance P is the length of a segment of the straight line L between two protrusions adjacent to each other on the straight line L. In the case where three or more protrusions are present on the straight line L, the average of the distances between two to five pairs of the protrusions may be used as a distance P.

The protrusions may include groups of protrusions, each of the groups corresponding to a specific one of virtual straight lines. Each of the groups of protrusions may include at least two protrusions arranged on a corresponding one of the virtual straight lines at certain distances. The longitudinal direction of each of the at least two protrusions included in each of the groups of protrusions may extend along the corresponding one of the virtual straight lines. The virtual straight lines may be arranged in a third direction. Each of the virtual straight lines may extend in a fourth direction that intersects the third direction.

The distance at which the at least two protrusions are disposed on each of the virtual straight lines may be larger than the minimum width of any of the protrusions disposed on the virtual straight line. On the first surface, the minimum distance between each adjacent two of the virtual straight lines may be larger than the minimum width of any of the protrusions disposed on the two adjacent straight lines.

The protrusions are arranged to protrude from the first surface toward a surface of the separator which faces the first surface. At least some of the protrusions may be arranged to come into contact with the separator. In the case where the protrusions are arranged to come into contact with the separator, the protrusions may come into contact with the separator with an insulating part disposed therebetween. The presence of the protrusions enables spaces to be created between the negative electrode current collector and the separator. Lithium metal is deposited in the spaces during charge. That is, the likelihood of lithium metal deposited between the protrusions and the separator may be reduced. This may further reduce partial expansion of the negative electrode. In order to further reduce the expansion of the negative electrode, 80% or more of the total area of the protrusions may come into contact with the separator. Alternatively, the entirety of the protrusions may come into contact with the separator.

The total area of the protrusions is the total area of a projection of the protrusions on the first surface in the thickness direction of the negative electrode current collector. The total area of the protrusions may be determined before the negative electrode current collector is formed into an electrode group. In the case where the areas of the protrusions are determined after the negative electrode current collector has been removed from the electrode group, the areas of protrusions included in a particular region of the negative electrode current collector may be calculated and the area fraction of the protrusions which is determined on the basis of the areas of the above protrusions may be considered as the above area fraction.

The ratio of the total area of the protrusions to the area of the first surface may be 0.2% or more and 70% or less. The area ratio of the protrusions may be 1% or more or 3% or more. When the area ratio of the protrusions falls within the above range, the separator may be readily supported by the protrusions and the distance between the first surface and the separator may be readily maintained consistent. As a result, the expansion of the negative electrode may be further reduced. The area ratio of the protrusions may be 50% or less. When the area ratio of the protrusions falls within the above range, spaces may be readily created between the first surface and the separator. As a result, it may become possible to achieve a further high discharge capacity while reducing the expansion of the negative electrode which is caused by the deposition of lithium metal. The above lower and upper limits may be combined with each other appropriately. The area of the first surface may be calculated before the negative electrode current collector is formed into an electrode group.

The heights of the protrusions may be determined in accordance with the amount of lithium metal that is deposited on the first surface. The average height of the protrusions above the first surface (hereinafter, referred to simply as "average height") may be set to 15 µm or more and 120 µm or less. The average height may be set to 20 µm or more or 30 µm or more. The average height may be set to 40 µm or more or 50 µm or more. When the average height falls within the above range, the change in the volume of the negative electrode which is caused by the deposition of lithium metal may be reduced in a further effective manner. Furthermore, damage to the electrode may be reduced in a further effective manner. The average height may be set to 110 µm or less, 100 µm or less, or 90 µm or less. When the average height falls within the above range, the lithium metal deposited on the first surface may be pressed by the separator at an adequate pressure and, consequently, the conductivity between the lithium metal and the negative electrode current collector may be increased. As a result, the charge/discharge efficiency may be increased. Moreover, the likelihood of the separator pressing the protrusions at an excessively high pressure may be reduced and, consequently, the electrodes may be protected. The above lower and upper limits may be combined with each other appropriately.

The average height may be determined by, for example, selecting ten random protrusions in a cross-sectional image of the negative electrode current collector taken in the thickness direction, measuring the distance between the first surface and the edge of each of the protrusions as the height of the protrusion, and averaging the heights of the ten protrusions. The average height may alternatively be determined by taking a piece of the negative electrode current collector having a certain area (e.g., 5 cm$^2$) in the first surface or pieces of the negative electrode current collector and averaging the heights of random protrusions selected from the piece having a certain area or the pieces. In such a case, the average height may be determined by taking cross-sectional images of the pieces having a certain area or the pieces, measuring the distance between the first surface and the edge of each of the protrusions as the height of the protrusion on the basis of the cross-sectional images, and averaging the heights of the protrusions. The protrusions that are to be measured may be arranged over the entirety of the first surface or only a part of the first surface.

In the case where the edges of the protrusions are not flat, the maximum height of each of the protrusions above the first surface is considered as the height of the protrusion. The average height of the protrusions may be measured on the basis of a cross-sectional image of the electrode group which covers a cross section of the negative electrode current collector taken in the thickness direction. In the case where the first surface is rough, the surface roughness Rz of the first surface may be 1 µm or less. The heights of the protrusions may exceed 1 µm. In the case where the electrodes are wound, the heights of the protrusions are measured after the electrode group has been unwound and spread such that the first surface becomes flat. In the case where the first surface is rough, the heights of the protrusions are measured with respect to the top of the irregularities.

The structure of the lithium secondary battery according to the embodiment is specifically described below. Hereinafter, the same or similar elements are denoted by the same reference numeral and the duplicate description thereof may be omitted.

Negative Electrode

The negative electrode includes a negative electrode current collector. The negative electrode current collector includes a layer having a first surface and protrusions protruding from the first surface. While the lithium secondary battery is charged, lithium metal is deposited on the first surface. Specifically, while the lithium secondary battery is charged, lithium ions contained in the nonaqueous electrolyte receive electrons on the negative electrode current collector to form lithium metal, which is deposited on the surface of the negative electrode current collector. While the lithium secondary battery is discharged, the lithium metal deposited on the surface of the negative electrode current collector dissolves in the nonaqueous electrolyte to form lithium ions. The lithium ions contained in the nonaqueous electrolyte may be lithium ions derived from a lithium salt included in the nonaqueous electrolyte or lithium ions fed from the positive electrode active material while the lithium secondary battery is charged. In another case, the nonaqueous electrolyte may include both of the above types of lithium ions.

Since the negative electrode current collector includes protrusions formed on the first surface, spaces capable of accommodating deposited lithium metal are created in the vicinity of the first surface. The spaces may reduce the expansion of the negative electrode which is caused by the deposition of lithium metal.

FIGS. 1 to 9 are schematic top plan views of negative electrode current collectors according to Embodiments 1 to 9 of the present disclosure, respectively. Each of the negative electrode current collectors illustrated in FIGS. 1 to 5 includes a conductive sheet (i.e., an example of the layer) 342, first protrusions 341A having a first longitudinal direction A, and second protrusions 341B having a second longitudinal direction B that intersects the first longitudinal direction A. The first protrusions 341A and the second protrusions 341B are disposed on the conductive sheet 342. Each of the negative electrode current collectors illustrated in FIGS. 6 to 9 includes a conductive sheet (i.e., an example of the layer) 342 and protrusions 341. The protrusions 341 are disposed on the conductive sheet 342 such that all of the protrusions 341 have the same longitudinal direction, that is, a third longitudinal direction C. The protrusions 341 include groups of protrusions, each of the groups corresponding to a specific one of virtual straight lines that extend in the third longitudinal direction C. Each of the groups of protrusions includes at least two protrusions arranged on the corresponding one of the virtual straight lines at a distance P. In FIGS. 1 to 9, the negative electrode current collector 34 is rectangular and has a fourth longitudinal direction X and a lateral direction Y. In FIGS. 1 to 7, the maximum width of each of the protrusions is smaller than the minimum width D34 of the negative electrode current collector 34.

Embodiment 1

FIG. 1 illustrates an example of the negative electrode current collector according to Embodiment 1. The angle formed by the first longitudinal direction A and the fourth longitudinal direction X is 45°. The angle formed by the second longitudinal direction B and the fourth longitudinal direction X is 45°. The angle formed by the first longitudinal direction A and the second longitudinal direction B is 90°. The first protrusions 341A and the second protrusions 341B are arranged in a regular pattern such that (1) a second protrusion 341B is disposed between two first protrusions 341A adjacent to each other in the first longitudinal direction A, (2) a second protrusion 341B is disposed between two first protrusions 341A adjacent to each other in the second longitudinal direction B, (3) a first protrusion 341A is disposed between two second protrusions 341B adjacent to each other in the first longitudinal direction A, and (4) a first protrusion 341A is disposed between two second protrusions 341B adjacent to each other in the second longitudinal direction B. Virtual first protrusions (not illustrated) formed by extending the first protrusions 341A in the first longitudinal direction A may intersect virtual second protrusions (not illustrated) formed by extending the second protrusions 341B in the second longitudinal direction B on the first surface.

The minimum clearance between each pair of the first protrusions 341A adjacent to each other in the first longitudinal direction A is the same, that is, P1. Alternatively, the minimum clearance between at least one pair of the first protrusions 341A may be different from the minimum clearance between at least another pair of the first protrusions 341A. The minimum clearance between each pair of the second protrusions 341B adjacent to each other in the second longitudinal direction B is the same, that is, P2. Alternatively, the minimum clearance between at least one pair of the second protrusions 341B may be different from the minimum clearance between at least another pair of the second protrusions 341B.

The first protrusions 341A have the same minimum width $D1_{min}$. Alternatively, the minimum width of at least one of the first protrusions 341A may be different from that of the other first protrusions 341A. The first protrusions 341A have the same maximum width $D1_{max}$. Alternatively, the maximum width of at least one of the first protrusions 341A may be different from that of the other first protrusions 341A. The second protrusions 341B have the same minimum width $D2_{min}$. Alternatively, the minimum width of at least one of the second protrusions 341B may be different from that of the other second protrusions 341B. The second protrusions 341B have the same maximum width $D2_{max}$. Alternatively, the maximum width of at least one of the second protrusions 341B may be different from that of the other second protrusions 341B.

The longitudinal direction of each of the first protrusions 341A is not necessarily the same. For example, the longitudinal direction of each of the first protrusions 341A may extend in a first direction, and the longitudinal direction of each of the second protrusions 341B may extend in a second direction that intersects the first direction. The angle formed by the first direction and the fourth longitudinal direction X may be 45°, 30°, or another angle. The angle formed by the second direction and the fourth longitudinal direction X may be 45°, 30°, or another angle. The angle formed by the first and second directions may be 90°, 60°, or another angle.

The above relationships regarding the minimum and maximum widths of the first protrusions 341A, the above relationships regarding the minimum and maximum widths of the second protrusions 341B, and the above relationships regarding the longitudinal directions of the first and second protrusions 341A and 341B apply to Embodiments 2 to 5. The description regarding the first and second directions also applies to Embodiments 2 to 5.

Embodiment 2

Figure 2:
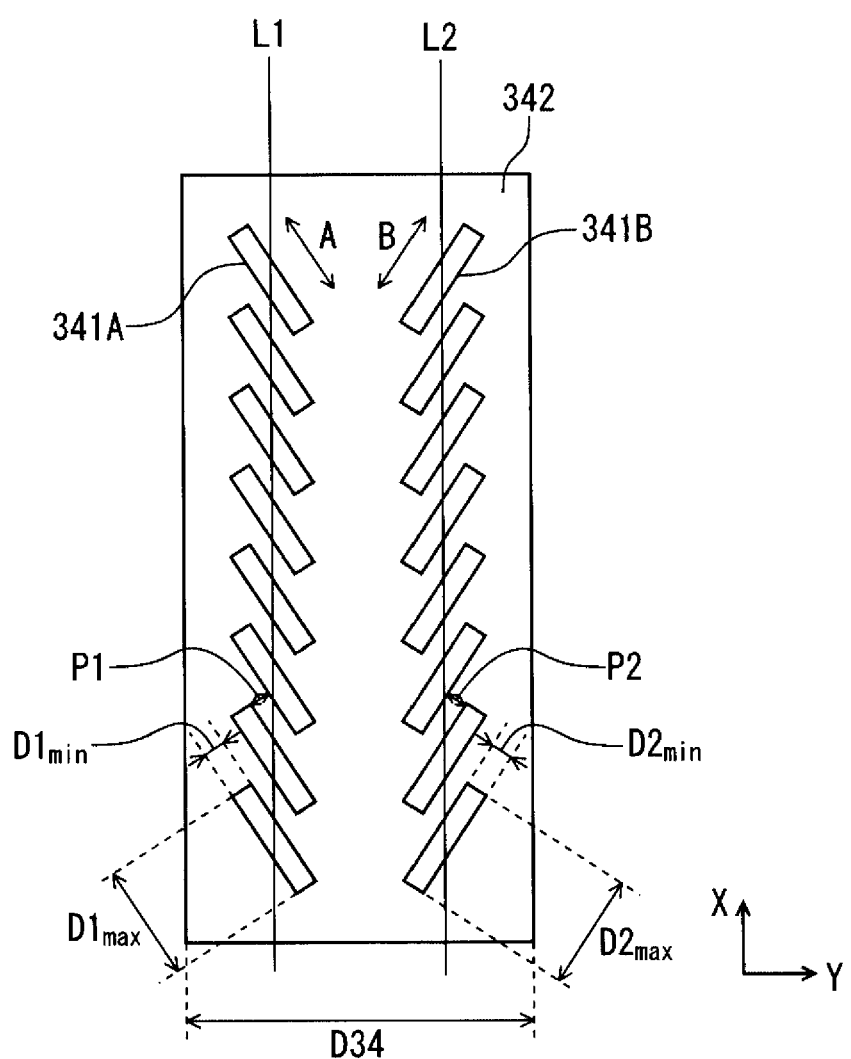
FIG. 2 is a schematic top plan view of a negative electrode current collector according to another embodiment of the present disclosure.

FIG. 2 illustrates an example of the negative electrode current collector according to Embodiment 2. The first protrusions 341A are arranged in the fourth longitudinal direction X in a regular pattern. That is, on the first surface, an approximate straight line L1 that passes through the centers of the first protrusions 341A extends in the fourth longitudinal direction X. In particular, in Embodiment 2, the approximate straight line L1 is parallel to the fourth longitudinal direction X. Note that, the angle formed by the first longitudinal direction A and the fourth longitudinal direction X is 30°.

Similarly to the first protrusions 341A, the second protrusions 341B are arranged in the fourth longitudinal direction X in a regular pattern. That is, on the first surface, an approximate straight line L2 that passes through the centers of the second protrusions 341B extends in the fourth longitudinal direction X. In particular, in Embodiment 2, the approximate straight line L2 is parallel to the fourth longitudinal direction X. Note that, the angle formed by the second longitudinal direction B and the fourth longitudinal direction X is 30°.

The acute angle formed by the first and second longitudinal directions A and B is 60°. Virtual first protrusions (not illustrated) formed by extending the first protrusions 341A in the first longitudinal direction A may intersect virtual second protrusions (not illustrated) formed by extending the second protrusions 341B in the second longitudinal direction B on the first surface.

The minimum clearance between each pair of the first protrusions 341A adjacent to each other is the same, that is, P1. Alternatively, the minimum clearance between at least one pair of the first protrusions 341A may be different from the minimum clearance between at least another pair of the first protrusions 341A. The minimum clearance between each pair of the second protrusions 341B adjacent to each other is the same, that is, P2. Alternatively, the minimum clearance between at least one pair of the second protrusions 341B may be different from the minimum clearance between at least another pair of the second protrusions 341B.

The above relationship regarding the minimum clearance between each pair of the first protrusions 341A and the above relationship regarding the minimum clearance between each pair of the second protrusions 341B apply to Embodiments 3 to 5.

Embodiment 3

Figure 3:
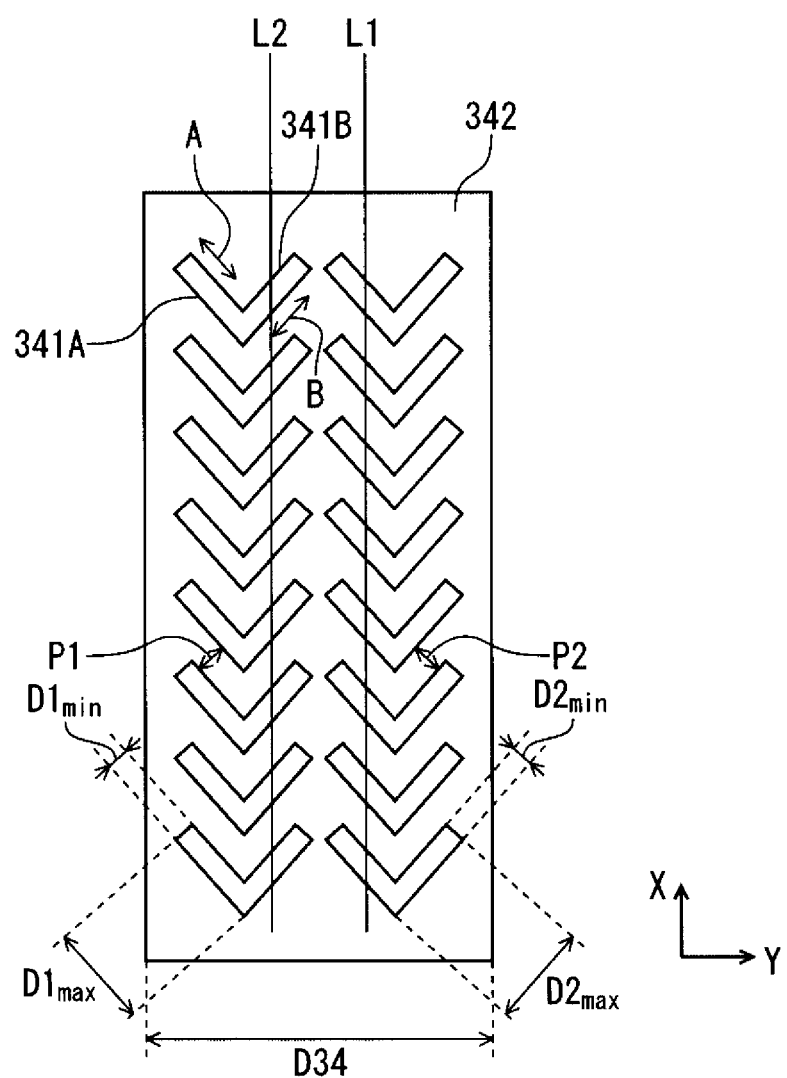
FIG. 3 is a schematic top plan view of a negative electrode current collector according to still another embodiment of the present disclosure.

FIG. 3 illustrates an example of the negative electrode current collector according to Embodiment 3. The first protrusions 341A are arranged in the fourth longitudinal direction X in a regular pattern. The first protrusions 341A include groups of protrusions (e.g., two groups of protrusions). On the first surface, an approximate straight line L1 that passes through the centers of at least two first protrusions 341A included in each of the groups of protrusions extends in the fourth longitudinal direction X. In particular, in Embodiment 3, the approximate straight lines L1 are parallel to the fourth longitudinal direction X. Note that, the angle formed by the first longitudinal direction A and the fourth longitudinal direction X is 45°.

Similarly to the first protrusions 341A, the second protrusions 341B are arranged in the fourth longitudinal direction X in a regular pattern. The second protrusions 341B include groups of protrusions (e.g., two groups of protrusions). On the first surface, an approximate straight line L2 that passes through the centers of at least two second protrusions 341B included in each of the groups of protrusions extends in the fourth longitudinal direction X. In particular, in Embodiment 3, the approximate straight lines L2 are parallel to the fourth longitudinal direction X. Note that, the angle formed by the second longitudinal direction B and the fourth longitudinal direction X is 45°.

The angle formed by the first and second longitudinal directions A and B is 90°. Each of the first protrusions 341A intersects a specific one of the second protrusions 341B on the first surface. In other words, each of the first protrusions 341A is joined to a specific one of the second protrusions 341B.

Embodiment 4

Figure 4:
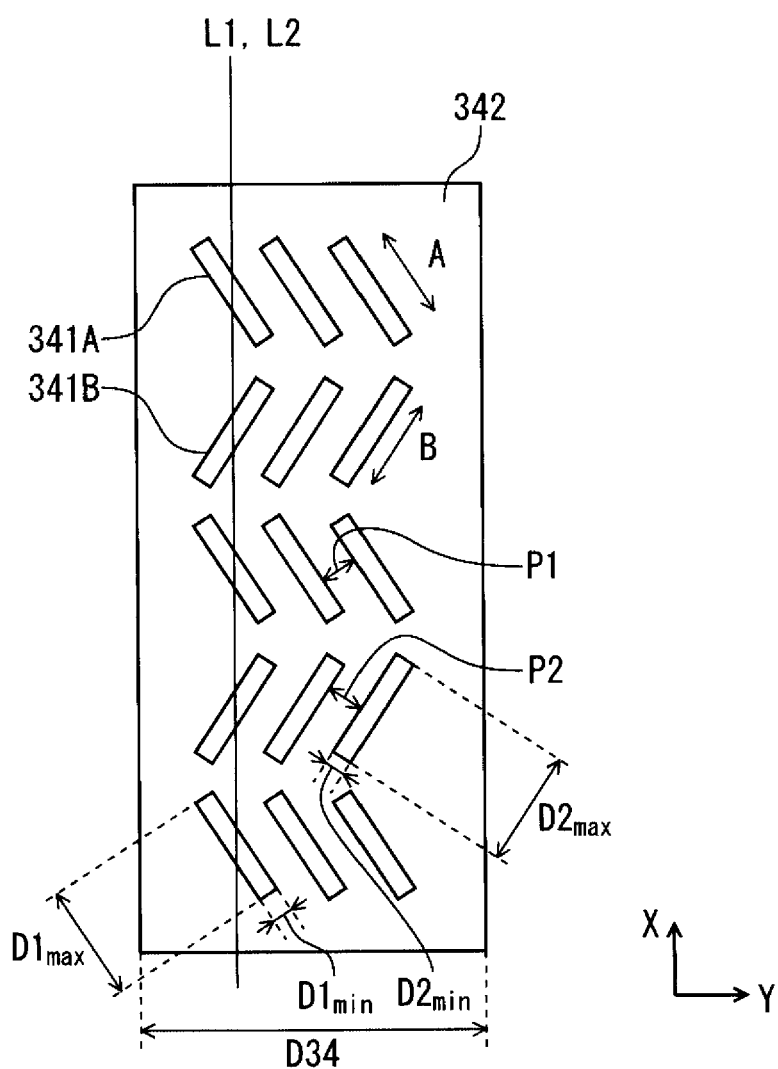
FIG. 4 is a schematic top plan view of a negative electrode current collector according to yet another embodiment of the present disclosure.

FIG. 4 illustrates an example of the negative electrode current collector according to Embodiment 4. The first protrusions 341A are arranged in the fourth longitudinal direction X in a regular pattern. The first protrusions 341A include groups of protrusions (e.g., three groups of protrusions). On the first surface, an approximate straight line L1 that passes through the centers of at least two first protrusions 341A included in each of the groups of protrusions extends in the fourth longitudinal direction X. In particular, in Embodiment 4, the approximate straight lines L1 are parallel to the fourth longitudinal direction X. Note that, the angle formed by the first longitudinal direction A and the fourth longitudinal direction X is 30°. A specific one of the second protrusions 341B is disposed between each pair of the first protrusions 341A adjacent to each other in the fourth longitudinal direction X.

Similarly to the first protrusions 341A, the second protrusions 341B are arranged in the fourth longitudinal direction X in a regular pattern. The second protrusions 341B include groups of protrusions (e.g., three groups of protrusions). On the first surface, an approximate straight line L2 that passes through the centers of at least two second protrusions 341B included in each of the groups of protrusions extends in the fourth longitudinal direction X. In particular, in Embodiment 4, the approximate straight lines L2 are parallel to the fourth longitudinal direction X and located at the same position as the approximate straight line L1. Note that, the angle formed by the second longitudinal direction B and the fourth longitudinal direction X is 30°. A specific one of the first protrusions 341A is disposed between each pair of the second protrusions 341B adjacent to each other in the fourth longitudinal direction X.

The acute angle formed by the first and second longitudinal directions A and B is 60°. Virtual first protrusions (not illustrated) formed by extending the first protrusions 341A in the first longitudinal direction A may intersect virtual second protrusions (not illustrated) formed by extending the second protrusions 341B in the second longitudinal direction B on the first surface.

Embodiment 5

Figure 5:
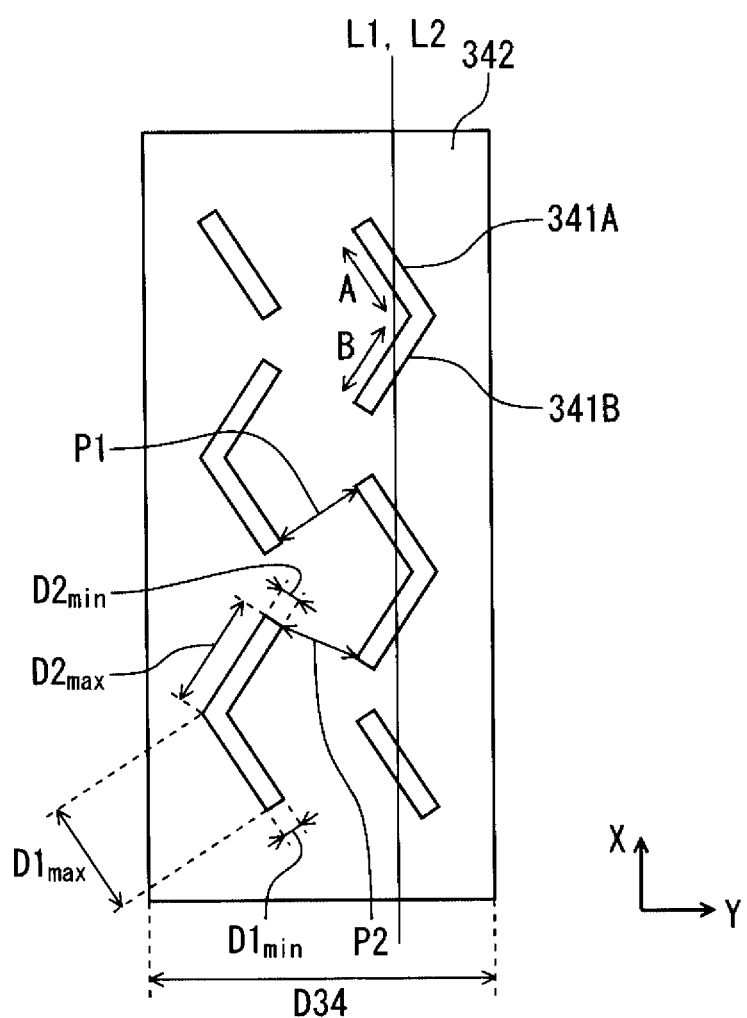
FIG. 5 is a schematic top plan view of a negative electrode current collector according to still another embodiment of the present disclosure.

FIG. 5 illustrates an example of the negative electrode current collector according to Embodiment 5. The first protrusions 341A are arranged in the fourth longitudinal direction X in a regular pattern. The first protrusions 341A include groups of protrusions (e.g., two groups of protrusions). On the first surface, an approximate straight line L1 that passes through the centers of at least two first protrusions 341A included in each of the groups of protrusions extends in the fourth longitudinal direction X. In particular, in Embodiment 5, the approximate straight lines L1 are parallel to the fourth longitudinal direction X. Note that, the angle formed by the first longitudinal direction A and the fourth longitudinal direction X is 30°. A specific one of the second protrusions 341B is disposed between each pair of the first protrusions 341A adjacent to each other in the fourth longitudinal direction X.

Similarly to the first protrusions 341A, the second protrusions 341B are arranged in the fourth longitudinal direction X in a regular pattern. The second protrusions 341B include groups of protrusions (e.g., two groups of protrusions). On the first surface, an approximate straight line L2 that passes through the centers of at least two second protrusions 341B included in each of the groups of protrusions extends in the fourth longitudinal direction X. In particular, in Embodiment 5, the approximate straight lines L2 are parallel to the fourth longitudinal direction X and located at the same position as the approximate straight lines L1. Note that, the angle formed by the second longitudinal direction B and the fourth longitudinal direction X is 30°. A specific one of the first protrusions 341A is disposed between each pair of the second protrusions 341B adjacent to each other in the fourth longitudinal direction X.

The acute angle formed by the first and second longitudinal directions A and B is 60°. Each of the first protrusions 341A intersects a specific one of the second protrusions 341B on the first surface. In other words, each of the first protrusions 341A is joined to a specific one of the second protrusions 341B.

Embodiment 6

Figure 6:
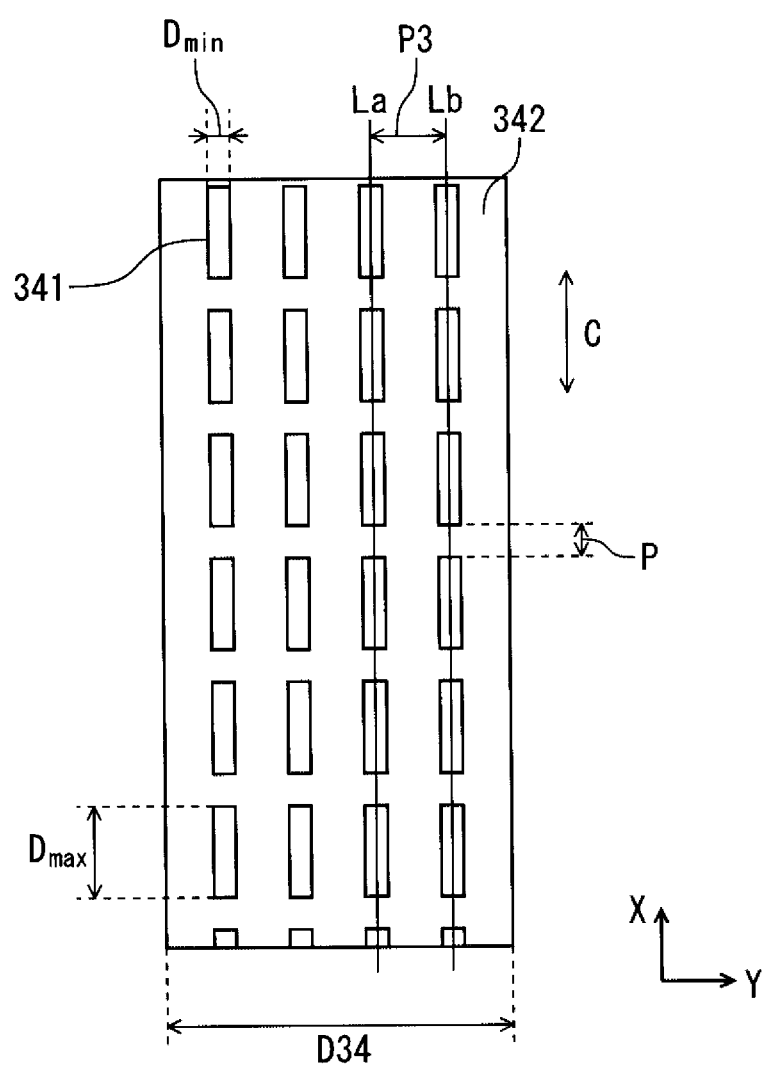
FIG. 6 is a schematic top plan view of a negative electrode current collector according to yet another embodiment of the present disclosure.

FIG. 6 illustrates an example of the negative electrode current collector according to Embodiment 6. All of the protrusions 341 have the same longitudinal direction, that is, a third longitudinal direction C. In Embodiment 6, the third longitudinal direction C extends in the fourth longitudinal direction X. In particular, the third longitudinal direction C is parallel to the fourth longitudinal direction X. The protrusions 341 include groups of protrusions (e.g., four groups of protrusions), each of the groups corresponding to a specific one of virtual straight lines that include approximate straight lines La and Lb. The virtual straight lines extend in the third longitudinal direction C of the protrusions 341. Each of the virtual straight lines may be an approximate straight line that passes through the centers of at least two protrusions 341 included in a corresponding one of the groups of protrusions on the first surface. At least two protrusions 341 included in each of the groups of protrusions are arranged on a corresponding one of the virtual straight lines in a regular pattern at a distance P.

The distance between each pair of the protrusions 341 adjacent to each other in the third longitudinal direction C is the same, that is, P. Alternatively, the distance between at least one pair of the protrusions 341 may be different from the distance between at least another pair of the protrusions 341. The protrusions 341 have the same minimum width $D_{min}$. Alternatively, the minimum width of at least one of the protrusions 341 may be different from that of at least one of the other protrusions 341. The protrusions 341 have the same maximum width $D_{max}$. Alternatively, the maximum width of at least one of the protrusions 341 may be different from that of at least one of the other protrusions 341.

The longitudinal direction of each of the protrusions 341 is not necessarily the same. For example, the longitudinal direction of each of at least two protrusions 341 included in each of the groups of protrusions may extend along a corresponding one of the virtual straight lines. The virtual straight lines may be arranged in a third direction, such as the lateral direction Y or the fourth longitudinal direction X. Each of the virtual straight lines may extend in a fourth direction that intersects the third direction, such as the fourth longitudinal direction X or the lateral direction Y.

The minimum distance between each pair of the virtual straight lines adjacent to each other is the same, that is, P3. Alternatively, the minimum distance between at least one pair of the virtual straight lines may be different from the minimum distance between at least another pair of the virtual straight lines.

The above relationship regarding the distance between each pair of the protrusions 341, the above relationships regarding the minimum width, maximum width, and longitudinal direction of each of the protrusions 341, and the above relationship regarding the virtual straight lines apply to Embodiments 7 to 9.

Embodiment 7

Figure 7:
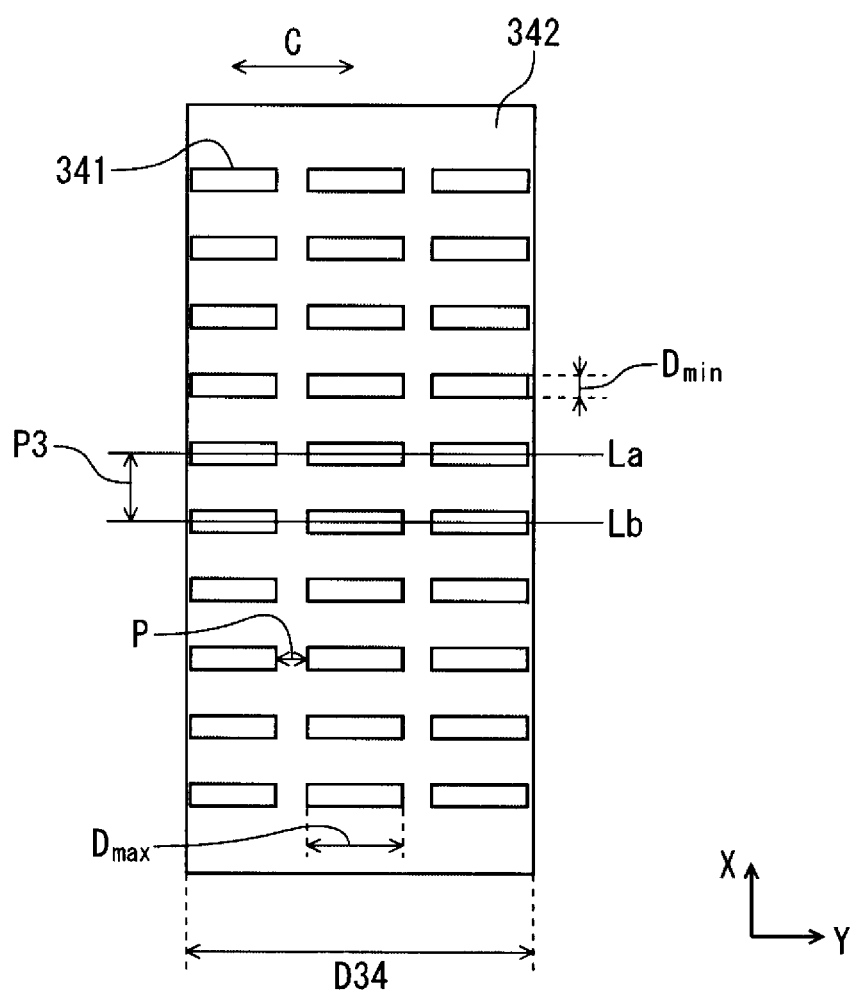
FIG. 7 is a schematic top plan view of a negative electrode current collector according to still another embodiment of the present disclosure.

FIG. 7 illustrates an example of the negative electrode current collector according to Embodiment 7. All of the protrusions 341 have the same longitudinal direction, that is, a third longitudinal direction C. In Embodiment 7, the third longitudinal direction C extends in the lateral direction Y. In particular, the third longitudinal direction C is parallel to the lateral direction Y. The protrusions 341 include groups of protrusions (e.g., ten groups of protrusions), each of the groups corresponding to a specific one of virtual straight lines that include approximate straight lines La and Lb. The virtual straight lines extend in the third longitudinal direction C of the protrusions 341. Each of the virtual straight lines may be an approximate straight line that passes through the centers of at least two protrusions 341 included in a corresponding one of the groups of protrusions on the first surface. At least two protrusions 341 included in each of the groups of protrusions are arranged on a corresponding one of the virtual straight lines in a regular pattern at a distance P.

Embodiment 8

FIG. 8 illustrates an example of the negative electrode current collector according to Embodiment 8. The negative electrode current collector according to Embodiment 8 has the same structure as that according to Embodiment 6, except that the protrusions 341 formed on the negative electrode current collector according to Embodiment 8 include at least one protrusion 341 having a maximum width larger than the minimum width of the negative electrode current collector. However, since at least two protrusions 341 disposed on each of the virtual straight lines are arranged at a certain distance, the protrusions 341 do not divide the first surface of the conductive sheet 342, on which the protrusions 341 are disposed, into parts.

The positions of the distances between the protrusions disposed on the virtual straight lines may be located on at least one virtual straight line $L_x$ that intersects the virtual straight lines and does not intersect any of the protrusions 341 as illustrated in FIG. 8. The same applies to Embodiments 6 and 7.

Embodiment 9

FIG. 9 illustrates an example of the negative electrode current collector according to Embodiment 9. The negative electrode current collector according to Embodiment 9 has the same structure as that according to Embodiment 8, except that the positions of the distances between the protrusions disposed on the virtual straight lines are located on at least two virtual straight lines $L_m$ and $L_n$ each of which intersects the virtual straight lines and some of the protrusions 341. In Embodiments 6 and 7, similarly to Embodiment 9, the positions of the distances between the protrusions disposed on the virtual straight lines may be located on at least two virtual straight lines $L_m$ and $L_n$ each of which intersects the virtual straight lines and some of the protrusions 341.

In the present disclosure, at least one third protrusion having a spot-like shape may be disposed on the first surface in addition to at least one long-rectangular protrusion. The term "spot-like" used herein refers to the shape of a protrusion such that the ratio of the long side LL of a smallest rectangle that surrounds the projection of the protrusion to the short side SL of the rectangle (LL/SL) is less than 2 or the rectangle is square. Specific examples of the spot-like shape include, but are not limited to, a circular shape, an elliptical shape, and a polygonal shape.

A second surface opposite to the first surface may be provided with the protrusions disposed thereon as well as the first surface. When viewed in the direction of the normal to the first surface, a figure formed by projecting the protrusions disposed on the first surface onto the first surface does not necessarily overlap a figure formed by projecting the protrusions disposed on the second surface onto the second surface. The projection of the protrusions disposed on the first surface may partly or completely overlap the projection of the protrusions disposed on the second surface.

The negative electrode current collector includes a conductive sheet and the protrusions. Examples of the conductive sheet include a foil and a film.

The conductive sheet may have a flat and smooth surface. In such a case, the lithium metal derived from the positive electrode is likely to be deposited uniformly on the conductive sheet during charge. The expression "flat and smooth" used herein means that the maximum roughness height Rz of the conductive sheet is 20 µm or less. The maximum roughness height Rz of the conductive sheet may be 10 µm or less. Measurement of maximum roughness height Rz is conducted in accordance with JIS B 0601:2013.

The conductive sheet is composed of, for example, a conductive material other than lithium metal or a lithium alloy. The conductive material may be a metal material, such as a metal or an alloy. The conductive material may be a material that does not react with lithium. Examples of such a material include materials that do not react with lithium metal and/or a lithium ion. Specific examples thereof include a material that does not react with lithium to form an alloy or an intermetallic compound. Examples of such a conductive material include copper (Cu), nickel (Ni), iron (Fe), alloys of these metal elements, and graphite the basal plane of which is preferentially exposed. Examples of the alloy include a copper alloy and stainless steel (SUS). Copper and/or a copper alloy, which has a high conductivity, may be used as a conductive material in order to readily achieve a large battery capacity and a high charge/discharge efficiency. The conductive sheet may include one or more of the above conductive materials.

The thickness of the conductive sheet is not limited and may be, for example, 5 µm or more and 300 µm or less.

The protrusions may be composed of any material. The protrusions and the conductive sheet may be composed of different materials. Alternatively, the protrusions and the conductive sheet may be formed in one piece using the same material. The protrusions may be composed of a conductive material and/or an insulative material. The conductive material may be appropriately selected from the conductive materials described above as examples of the material of the conductive sheet. The above-described negative electrode current collector including the protrusions may be produced by, for example, forming the protrusions on the surfaces of the conductive sheet by press working or the like. The negative electrode current collector may alternatively be produced by applying a coating material that includes the conductive material onto the surfaces of the conductive sheet or putting a strip of tape composed of the conductive material onto the surfaces of the conductive sheet.

The protrusions may be composed of a resin material. The resin material may be insulative. When the protrusions are composed of an insulative material, such as a resin material, the deposition of lithium metal on the edges of the protrusions during charge may be reduced. The lithium metal deposited during charge is accommodated inside the negative electrode current collector, that is, specifically, in spaces created in the vicinity of the surfaces of the conductive sheet, such as a metal foil. This may further reduce the expansion of the negative electrode.

The resin material may be, for example, at least one material selected from the group consisting of an olefin resin, an acrylic resin, a polyamide resin, a polyimide resin, and a silicone resin. The resin material may be produced by curing a curable resin, such as an epoxy resin. The protrusions may be formed by, for example, putting strips of resin adhesive tape onto the surfaces of the conductive sheet. The protrusions may alternatively be formed by applying a solution or dispersion containing the resin material onto the surfaces of the conductive sheet and drying the resulting coating film. In another case, the protrusions may be formed by applying a curable resin onto the surfaces of the conductive sheet in a desired pattern and curing the resulting coating film.

A negative electrode mixture layer (not illustrated) may optionally be formed on the surfaces of the conductive sheet. In such a case, the negative electrode mixture and the conductive sheet correspond to an example of the layer. The negative electrode mixture layer may include lithium metal. The negative electrode mixture layer may be disposed over the entire surfaces of the conductive sheet. The negative electrode mixture layer may be formed by, for example, depositing lithium metal on a part or the entirety of the surfaces of the conductive sheet by electrodeposition, vapor deposition, or the like. The negative electrode mixture layer may alternatively be formed by, for example, applying a paste containing a negative electrode active material, such as graphite, onto a part or the entirety of the surfaces of the conductive sheet. The order in which the negative electrode mixture layer and the protrusions are formed is not limited. The protrusions may be formed subsequent to the formation of the negative electrode mixture layer. The negative electrode mixture layer may be formed subsequent to the formation of the protrusions. Note that the negative electrode mixture layer is formed so as not to cover the entire surfaces of the protrusions. The thickness of the negative electrode mixture layer is not limited and may be, for example, 30 to 300 µm. The negative electrode mixture layer may include a first surface. The negative electrode mixture layer may further include a second surface.

Positive Electrode

The positive electrode includes, for example, a positive electrode current collector and a positive electrode mixture layer disposed on the positive electrode current collector. The positive electrode mixture layer includes, for example, a positive electrode active material, a conductant agent, and a binder. The positive electrode mixture layer may be disposed on both surfaces of the positive electrode current collector. The positive electrode may be produced by, for example, applying a positive electrode mixture slurry that includes the positive electrode active material, the conductant agent, and the binder on both surfaces of the positive electrode current collector, drying the resulting coating films, and then performing rolling.

The positive electrode active material is capable of occluding and releasing lithium ions. Examples of the positive electrode active material include a lithium transition metal oxide, a transition metal fluoride, a polyanion, a fluorinated polyanion, and a transition metal sulfide. The positive electrode active material may be a lithium transition metal oxide, which is produced at low cost and offers a high average discharge voltage.

Examples of a transition metal element included in the lithium transition metal oxide include Sc, Ti, V, Cr, Mn, Fe, Co, Ni, Cu, Y, Zr, and W. The lithium transition metal oxide may include one or more transition metal elements. The transition metal element may be at least one element selected from the group consisting of Co, Ni, and Mn. The lithium transition metal oxide may optionally include one or more typical metal elements. Examples of the typical metal elements include Mg, Al, Ca, Zn, Ga, Ge, Sn, Sb, Pb, and Bi. The typical metal elements may be Al and the like.

Examples of the conductant agent include a carbon material. Examples of the carbon material include carbon black, acetylene black, KETJENBLACK, carbon nanotubes, and graphite. The positive electrode mixture layer may include one or more conductant agents.

Examples of the binder include a fluororesin, polyacrylonitrile, a polyimide resin, an acrylic resin, a polyolefin resin, and a rubber-like polymer. Examples of the fluororesin include polytetrafluoroethylene and polyvinylidene fluoride. The positive electrode mixture layer 31 may include one or more binders.

The positive electrode current collector may be composed of a metal material including, for example, Al, Ti, or Fe. Examples of such a metal material include Al, an Al alloy, Ti, a Ti alloy, and an Fe alloy. The Fe alloy may be SUS.

The positive electrode current collector may be, for example, a porous or nonporous sheet. Examples of a sheet of a metal material include a metal foil (i.e., a metal film) and a metal mesh. The carbon material described above as an example of the conductant agent may optionally be applied onto the surfaces of the positive electrode current collector. In such a case, for example, the resistance may be reduced. Moreover, catalytic effects may be achieved. In addition, the bond between the positive electrode mixture layer and the positive electrode current collector may be strengthened.

Separator

The separator is a porous sheet having ionic permeability and an insulating property. Examples of the porous sheet include a thin-film, a woven fabric, and a nonwoven fabric that have micropores formed therein. The separator may be composed of any material. The separator may be composed of a high-molecular material. Examples of the high-molecular material include an olefin resin, a polyamide resin, and cellulose. Examples of the olefin resin include polyethylene, polypropylene, and a copolymer of ethylene with propylene. The separator may optionally include an additive. Examples of the additive include an inorganic filler.

The separator may include layers having different structures and/or compositions. Examples of such a separator include a multilayer body constituted by a microporous polyethylene film and a microporous polypropylene film stacked on top of each other; and a multilayer body constituted by a nonwoven fabric including cellulose fibers and a nonwoven fabric including thermoplastic resin fibers which are stacked on top of each other. The separator may be produced by forming a polyamide resin film on the surface of a microporous film, a woven fabric, a nonwoven fabric, or the like. The above separators have high durability even when pressurized while being in contact with the protrusions. In order to enhance heat resistance and/or increase strength, a layer including an inorganic filler may be formed on the surface of the separator which faces the positive electrode and/or the surface of the separator which faces the negative electrode.

Nonaqueous Electrolyte

The nonaqueous electrolyte is conductive to lithium ions. The nonaqueous electrolyte includes a nonaqueous solvent and lithium ions and anions dissolved in the nonaqueous solvent. The nonaqueous electrolyte may be liquid or gelatinous. The nonaqueous electrolyte may be a solid electrolyte.

A nonaqueous liquid electrolyte may be prepared by dissolving a lithium salt in a nonaqueous solvent. While the lithium salt dissociate into lithium ions and anions when dissolved in the nonaqueous solvent, the nonaqueous electrolyte may include an undissociated lithium salt.

The gelatinous nonaqueous electrolyte may be a nonaqueous electrolyte including a lithium salt and a matrix polymer or a nonaqueous electrolyte including a lithium salt, a nonaqueous solvent, and a matrix polymer. The matrix polymer is, for example, a polymer material that gelatinizes upon absorbing the nonaqueous solvent. The polymer material may be at least one material selected from the group consisting of a fluororesin, an acrylic resin, and a polyether resin.

The lithium salt and the anions may be selected from known lithium salts and anions included in nonaqueous electrolytes for lithium secondary batteries. Examples of the anions include $BF_4^-$, $ClO_4^-$, $PF_6^-$, $CF_3SO_3^-$, $CF_3CO_2^-$, anions of imides, and anions of oxalates. Examples of the imide anion include $N(SO_2CF_3)_2^-$ and $N(C_mF_{2m+1}SO_2)_x(C_nF_{2n+1}SO_2)_y^-$, where m and n each independently represent an integer of 0 or more, x and y each independently represent 0, 1, or 2, and x+y=2. The oxalate complex anion may include boron and/or phosphorus. Examples of the oxalate complex anion include a bisoxalatoborate anion, $BF_2(C_2O_4)^-$, $PF_4(C_2O_4)^-$, and $PF_2(C_2O_4)_2^-$. The nonaqueous electrolyte may include one or more anions selected from the above anions.

In order to reduce the dendritic deposition of lithium metal, the nonaqueous electrolyte may include at least one anion selected from the group consisting of $PF_6^-$, anions of imides, and anions of oxalates. The imide anion may be $N(SO_2CF_3)_2^-$, $N(SO_2C_2F_5)_2^-$, or $N(SO_2F)_2^-$. In particular, when the nonaqueous electrolyte includes an oxalate complex anion, lithium metal is likely to be uniformly deposited in the form of fine particles, as a result of an interaction between the oxalate complex anion and lithium and, consequently, the likelihood of the negative electrode nonuniformly expanding due to the partial deposition of the lithium metal may be reduced. The oxalate complex anion may be used in combination with other anions. The other anions may be $PF_6^-$ and/or anions of imides.

Examples of the nonaqueous solvent include an ester, an ether, a nitrile, an amide, and halogenated derivatives thereof. The nonaqueous electrolyte may include one or more nonaqueous solvents selected from the above nonaqueous solvents. Examples of the halogenated derivatives include a fluoride.

Examples of the ester include a carbonate ester and a carboxylate ester. Examples of a cyclic carbonate ester include ethylene carbonate, propylene carbonate, and fluoroethylene carbonate (FEC). Examples of a chain carbonate ester include dimethyl carbonate (DMC), ethyl methyl carbonate (EMC), and diethyl carbonate. Examples of a cyclic carboxylate ester include γ-butyrolactone and γ-valerolactone. Examples of a chain carboxylate ester include ethyl acetate, methyl propionate, and methyl fluoropropionate.

Examples of the ether include a cyclic ether and a chain ether. Examples of the cyclic ether include 1,3-dioxolane, 4-methyl-1,3-dioxolane, tetrahydrofuran, and 2-methyltetrahydrofuran. Examples of the chain ether include 1,2-dimethoxyethane, diethyl ether, ethyl vinyl ether, methyl phenyl ether, benzyl ethyl ether, diphenyl ether, dibenzyl ether, 1,2-diethoxyethane, and diethylene glycol dimethyl ether.

The concentration of the lithium salt in the nonaqueous electrolyte is, for example, 0.5 mol/L or more and 3.5 mol/L or less. Note that, the lithium salt concentration is the sum of the concentration of dissociated lithium salt and the concentration of undissociated lithium salt. The anion concentration in the nonaqueous electrolyte may be 0.5 mol/L or more and 3.5 mol/L or less.

The nonaqueous electrolyte may include an additive. The additive may form a coating film on the negative electrode. Forming a coating film derived from the additive on the negative electrode may further reduce the formation of the dendrites. Examples of such an additive include vinylene carbonate, FEC, and vinyl ethyl carbonate (VEC). The above additives may be used alone or in combination of two or more.

Lithium Secondary Battery

A lithium secondary battery according to the present disclosure is described below with reference to the attached drawings, in which a cylindrical battery including a wound electrode group is illustrated as an example. However, the present disclosure is not limited by the lithium secondary battery described below.

Figure 10:
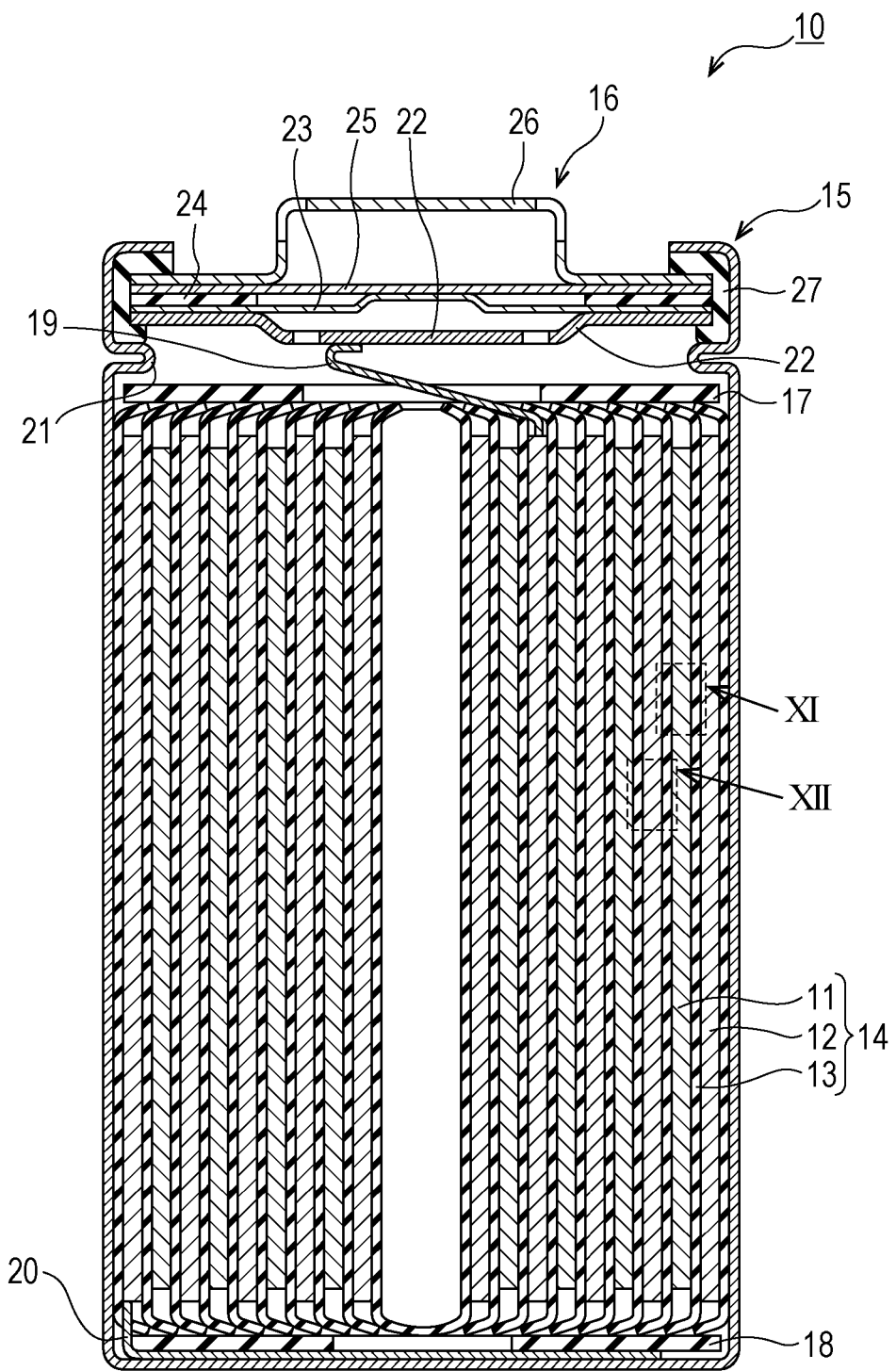
FIG. 10 is a schematic longitudinal cross-sectional view of a lithium secondary battery according to an embodiment of the present disclosure.
Figure 11:
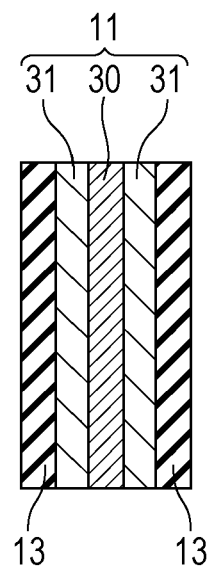
FIG. 11 is a schematic cross-sectional view of a positive electrode according to an embodiment of the present disclosure.
Figure 12:
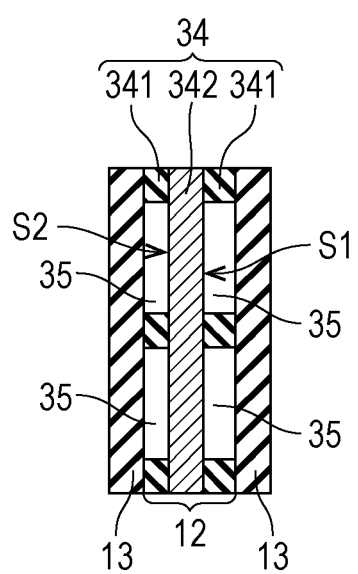
FIG. 12 is a schematic cross-sectional view of a negative electrode according to an embodiment of the present disclosure.

FIG. 10 is a longitudinal cross-sectional view of a lithium secondary battery 10, which is an example of the lithium secondary battery according to this embodiment. FIG. 11 is a schematic cross-sectional view of a positive electrode, which is an example of the positive electrode according to this embodiment. FIG. 12 is a schematic cross-sectional view of a negative electrode, which is an example of the negative electrode according to this embodiment. In the lithium secondary battery 10, lithium metal is deposited on a negative electrode 12 during charge and the lithium metal dissolves in a nonaqueous electrolyte (not illustrated) during discharge.

The lithium secondary battery 10 is a cylindrical battery that includes a cylindrical battery casing and a wound electrode group 14 and a nonaqueous electrolyte (not illustrated) that are accommodated in the battery casing. The battery casing includes a casing main body 15, which is a cylindrical metal container with a bottom, and a sealing plate 16 with which an opening formed in the casing main body 15 is sealed. A gasket 27 is disposed between the casing main body 15 and the sealing plate 16 in order to hermetically seal the battery casing. In the casing main body 15, insulating plates 17 and 18 are disposed at the respective edges of the electrode group 14 in the direction of the axis around which the electrode group 14 is wound.

The casing main body 15 includes a step 21 formed by, for example, pressing a portion of the side wall of the casing main body 15 from the outside of the casing main body 15. The step 21 may be formed on the side wall of the casing main body 15 in a circular shape in the circumferential direction of the casing main body 15. In such a case, the sealing plate 16 is supported by the opening-side surface of the step 21.

The sealing plate 16 includes a filter 22, a lower valve plate 23, an insulating member 24, an upper valve plate 25, and a cap 26, which are stacked on top of one another in this order. The sealing plate 16 is attached to the opening of the casing main body 15 such that the cap 26 is located on the outer side of the casing main body 15 and the filter 22 is located on the inner side of the casing main body 15. The above components of the sealing plate 16 may have, for example, a disc-like shape or a ring-like shape. The lower valve plate 23 and the upper valve plate 25 are connected to each other at the centers of the valve plates. The insulating member 24 is disposed between the lower valve plate 23 and the upper valve plate 25 in the circumferences of the valve plates. The filter 22 and the lower valve plate 23 are connected to each other at the centers of the filter 22 and the lower valve plate 23. The upper valve plate 25 and the cap 26 are connected to each other at the centers of the upper valve plate 25 and the cap 26. That is, the components other than the insulating member 24 are electrically connected to one another.

The lower valve plate 23 has a vent (not illustrated) formed therein. Therefore, if the internal pressure of the battery casing is increased due to anomalous heat generation or the like, the upper valve plate 25 bows toward the cap 26 and separates from the lower valve plate 23 and, as a result, the electrical connection between the lower valve plate 23 and the upper valve plate 25 becomes interrupted. If the internal pressure of the battery casing is further increased, the upper valve plate 25 may rupture and a gas may be discharged through an opening (not illustrated) formed in the cap 26.

The electrode group 14 includes a positive electrode 11, a negative electrode 12 that includes a negative electrode current collector 34, and a separator 13. The positive electrode 11, the negative electrode 12, the negative electrode current collector 34, and the separator 13 may be the above-described positive electrode, negative electrode, negative electrode current collector, and separator. The positive electrode 11, the negative electrode 12, and the separator 13 are band-like. The positive electrode 11 and the negative electrode 12 are wound into a spiral with the separator 13 disposed between the electrodes such that the width direction of the band-like positive electrode 11 and negative electrode 12 is parallel to the axis around which the electrodes are wound. In a cross section of the electrode group 14 which is orthogonal to the winding axis, the positive electrode 11 and the negative electrode 12 are alternately stacked on top of each other in the radial direction of the wound electrode group 14 with the separator 13 disposed between the electrodes. In other words, the longitudinal direction of the electrodes is parallel to the direction in which the electrode group 14 is wound, and the width direction of the electrodes is parallel to the direction of the axis around which the electrode group 14 is wound.

The positive electrode 11 is electrically connected to the cap 26, which serves also as a positive terminal, with a positive electrode lead 19. An end of the positive electrode lead 19 is connected to, for example, a portion of the positive electrode 11 which is in the vicinity of the center of the positive electrode 11 in the longitudinal direction. The positive electrode lead 19 extends from the positive electrode 11 to the filter 22 through a through-hole (not illustrated) formed in the insulating plate 17. The other end of the positive electrode lead 19 is welded to a surface of the filter 22 which faces the electrode group 14.

The negative electrode 12 is electrically connected to the casing main body 15, which serves also as a negative terminal, with a negative electrode lead 20. An end of the negative electrode lead 20 is connected to, for example, an edge of the negative electrode 12 in the longitudinal direction. The other end of the negative electrode lead 20 is welded to the inner bottom of the casing main body 15.

The positive electrode 11 includes a positive electrode current collector 30 and a positive electrode mixture layer 31 (see FIG. 11) and is electrically connected to the cap 26, which serves as a positive terminal, with a positive electrode lead 19. An end of the positive electrode lead 19 is connected to, for example, a portion of the positive electrode 11 which is in the vicinity of the center of the positive electrode 11 in the longitudinal direction. The positive electrode lead 19 extends from the positive electrode 11 to the filter 22 through a through-hole (not illustrated) formed in the insulating plate 17. The other end of the positive electrode lead 19 is welded to a surface of the filter 22 which faces the electrode group 14.

The negative electrode 12 includes the negative electrode current collector 34 (see FIG. 12) and is electrically connected to the casing main body 15, which serves as a negative terminal, with a negative electrode lead 20. The negative electrode current collector 34 includes a conductive sheet 342 and protrusions 341. An end of the negative electrode lead 20 is connected to, for example, an edge of the negative electrode 12 in the longitudinal direction. The other end of the negative electrode lead 20 is welded to the inner bottom of the casing main body 15.

The negative electrode current collector 34 includes protrusions 341 formed on each of the first surface S1 and the second surface S2. A space that is created at a location between each adjacent two of the protrusions 341 and between the first surface S1 and the separator 13 or between the second surface S2 and the separator 13 forms a space 35. In the lithium secondary battery 10, lithium metal is deposited in the spaces 35 during charge and the lithium metal dissolves in the nonaqueous electrolyte during discharge. Since the spaces 35 are capable of accommodating the deposited lithium metal, the change in the apparent volume of the negative electrode 12 which is caused by the deposition of lithium metal may be reduced and, consequently, the expansion of the negative electrode may be reduced. Furthermore, in the electrode group 14, a pressure is applied to the lithium metal accommodated in the spaces 35 and, as a result, detachment of the lithium metal may be reduced. This may limit a reduction in charge/discharge efficiency.

The apparent volume of the negative electrode 12 is the sum of the volume of the negative electrode 12, the volume of the deposited lithium metal, and the total volume of the spaces created by the protrusions 341.

Others

Although a cylindrical lithium secondary battery that includes a wound electrode group is described above as an example with reference to the drawings, the lithium secondary battery according to the above-described embodiment is not limited to this. The shape of the lithium secondary battery may be selected from, for example, a cylindrical shape, a coin-like shape, a rectangular shape, a sheet-like shape, and a flat shape appropriately in accordance with the application and the like. The structure of the electrode group is not limited and may be multilayer. The components of the lithium secondary battery which are other than the electrode group or the nonaqueous electrolyte are not limited and may be selected from known components of lithium secondary batteries.

EXAMPLES

The lithium secondary battery according to the present disclosure is specifically described below on the basis of Examples and Comparative examples. The present disclosure is not limited by Examples below.

Example 1

(1) Preparation of Positive Electrode

A lithium transition metal oxide containing Li, Ni, Co, and Al (NCA) which served as a positive electrode active material, acetylene black (AB) which served as a conductant agent, and polyvinylidene fluoride (PVdF) which served as a binder were mixed at a mass ratio of NCA:AB:PVdF=95:2.5:2.5. An appropriate amount of N-methyl-2-pyrrolidone (NMP) was added to the resulting mixture. The mixture was stirred to form a positive electrode mixture slurry. The positive electrode mixture slurry was applied onto both surfaces of an Al foil used as a positive electrode current collector. The resulting coating films of the positive electrode mixture were dried and then rolled with a roller. The resulting multilayer body including the positive electrode current collector and the positive electrode mixture was cut into a predetermined electrode size. Hereby, a positive electrode that included a positive electrode current collector and positive electrode mixture layers disposed on both surfaces thereof was prepared.

(2) Preparation of Negative Electrode

First protrusions and second protrusions (average height: 51 μm) were formed on the first surface of a rectangular electrolytic copper foil (thickness: 10 μm) as illustrated in FIG. 1 by ejecting a polyimide ink from a dispenser (sweep rate: 6 mm/sec, nozzle inner diameter: 0.72 mm) onto the first surface in a long-rectangular shape and performing hot-air drying.

Subsequently, protrusions were formed on the second surface of the electrolytic copper foil as in the formation of protrusions on the first surface. When the protrusions were formed on the second surface, the first and second surfaces were aligned with each other by determining the positions of four holes (diameter: 0.8 mm) formed in the respective corners of the electrolytic copper foil with a CCD camera such that the positions of the protrusions disposed on the first surface overlapped those of the protrusions disposed on the second surface. The resulting electrolytic copper foil was cut into a predetermined electrode size. Hereby, a negative electrode that included long-rectangular protrusions formed on each of the surfaces was prepared. The piece of the electrolytic copper foil cut into the electrode size had a width of 65 mm and a length of 1000 mm in the longitudinal direction.

The minimum clearance between each pair of the first protrusions 341A adjacent to each other in the first longitudinal direction A was 4.7 mm (see P1 in FIG. 1). The minimum width $D1_{min}$ of each of the first protrusions 341A was 1 mm. The minimum clearance between each pair of the second protrusions 341B adjacent to each other in the second longitudinal direction B was 4.7 mm (see P2 in FIG. 1). The minimum width $D2_{min}$ of each of the second protrusions 341B was 1 mm. The maximum width $D1_{max}$ of each of the first protrusions 341A was 8 mm. The maximum width $D2_{max}$ of each of the second protrusions 341B was 8 mm.

(3) Preparation of Nonaqueous Electrolyte

EC and DMC were mixed at a volume ratio of EC:DMC=30:70. In the resulting mixed solvent, $LiPF_6$ and $LiBF_2(C_2O_4)$ were dissolved such that the concentrations of $LiPF_6$ and $LiBF_2(C_2O_4)$ in the mixed solvent were 1 mol/L and 0.1 mol/L, respectively. Hereby, a nonaqueous liquid electrolyte was prepared.

(4) Preparation of Battery

An Al tab was attached to the positive electrode. A Ni tab was attached to the negative electrode. Subsequently, in an inert gas atmosphere, the positive and negative electrodes were wound into a spiral in a direction parallel to the longitudinal direction of the electrolytic copper foil with a polyethylene thin-film, which served as a separator, disposed between the electrodes. Hereby, a wound electrode group was prepared. In this electrode group, substantially all of the protrusions were in contact with the separator. The electrode group was placed in a bag-like package composed of a laminated sheet including an Al layer. After the nonaqueous electrolyte had been charged into the package accommodating the electrode group, the package was sealed. Hereby, a lithium secondary battery was prepared.

Example 2

In (2) Preparation of Negative Electrode, long-rectangular protrusions were formed on each of the surfaces of the electrolytic copper foil as in Example 1, except that the first protrusions and the second protrusions were arranged as illustrated in FIG. 2. A lithium secondary battery was prepared as in Example 1, except that the negative electrode prepared in Example 2 was used.

The minimum clearance between each pair of the first protrusions 341A adjacent to each other was 1 mm (see P1 in FIG. 2). The minimum width $D1_{min}$ of each of the first protrusions 341A was 1 mm. The minimum clearance between each pair of the second protrusions 341B adjacent to each other was 1 mm (see P2 in FIG. 2). The minimum width $D2_{min}$ of each of the second protrusions 341B was 1 mm. The maximum width $D1_{max}$ of each of the first protrusions 341A was 8 mm. The maximum width $D2_{max}$ of each of the second protrusions 341B was 8 mm.

Example 3

In (2) Preparation of Negative Electrode, long-rectangular protrusions were formed on each of the surfaces of the electrolytic copper foil as in Example 1, except that the first protrusions and the second protrusions were arranged as illustrated in FIG. 3. A lithium secondary battery was prepared as in Example 1, except that the negative electrode prepared in Example 3 was used.

The minimum clearance between each pair of the first protrusions 341A adjacent to each other was 2 mm (see P1 in FIG. 3). The minimum width $D1_{min}$ of each of the first protrusions 341A was 1 mm. The minimum clearance between each pair of the second protrusions 341B adjacent to each other was 2 mm (see P2 in FIG. 3). The minimum width $D2_{min}$ of each of the second protrusions 341B was 1 mm. The maximum width $D1_{max}$ of each of the first protrusions 341A was 8 mm. The maximum width $D2_{max}$ of each of the second protrusions 341B was 8 mm.

Example 4

In (2) Preparation of Negative Electrode, long-rectangular protrusions were formed on each of the surfaces of the electrolytic copper foil as in Example 1, except that the first protrusions and the second protrusions were arranged as illustrated in FIG. 4. A lithium secondary battery was prepared as in Example 1, except that the negative electrode prepared in Example 4 was used.

The minimum clearance between each pair of the first protrusions 341A adjacent to each other was 4 mm (see P1 in FIG. 4). The minimum width $D1_{min}$ of each of the first protrusions 341A was 1 mm. The minimum clearance between each pair of the second protrusions 341B adjacent to each other was 4 mm (see P2 in FIG. 4). The minimum width $D2_{min}$ of each of the second protrusions 341B was 1 mm. The maximum width $D1_{max}$ of each of the first protrusions 341A was 11 mm. The maximum width $D2_{max}$ of each of the second protrusions 341B was 11 mm.

Example 5

In (2) Preparation of Negative Electrode, long-rectangular protrusions were formed on each of the surfaces of the electrolytic copper foil as in Example 1, except that the first protrusions and the second protrusions were arranged as illustrated in FIG. 5. A lithium secondary battery was prepared as in Example 1, except that the negative electrode prepared in Example 5 was used.

The minimum clearance between each pair of the first protrusions 341A adjacent to each other was 9 mm (see P1 in FIG. 5). The minimum width $D1_{min}$ of each of the first protrusions 341A was 1 mm. The minimum clearance between each pair of the second protrusions 341B adjacent to each other was 9 mm (see P2 in FIG. 5). The minimum width $D2_{min}$ of each of the second protrusions 341B was 1 mm. The maximum width $D1_{max}$ of each of the first protrusions 341A was 11 mm. The maximum width $D2_{max}$ of each of the second protrusions 341B was 11 mm.

Example 6

In (2) Preparation of Negative Electrode, long-rectangular protrusions were formed on each of the surfaces of the electrolytic copper foil as in Example 1, except that the protrusions were arranged as illustrated in FIG. 6. A lithium secondary battery was prepared as in Example 1, except that the negative electrode prepared in Example 6 was used.

The distance between each pair of the protrusions 341 adjacent to each other in the third longitudinal direction C was 2 mm (see P in FIG. 6). The minimum distance between each pair of the virtual straight lines adjacent to each other was 4 mm (see P3 in FIG. 6). The maximum width $D_{max}$ of each of the protrusions 341 was 8 mm. The minimum width $D_{min}$ of each of the protrusions 341 was 1 mm.

Example 7

In (2) Preparation of Negative Electrode, long-rectangular protrusions were formed on each of the surfaces of the electrolytic copper foil as in Example 1, except that the protrusions were arranged as illustrated in FIG. 7. A lithium secondary battery was prepared as in Example 1, except that the negative electrode prepared in Example 7 was used.

The distance between each pair of the protrusions 341 adjacent to each other in the third longitudinal direction C was 2 mm (see P in FIG. 7). The minimum distance between each pair of the virtual straight lines adjacent to each other was 4 mm (see P3 in FIG. 7). The maximum width $D_{max}$ of each of the protrusions 341 was 11 mm. The minimum width $D_{min}$ of each of the protrusions 341 was 0.5 mm.

Example 8

In (2) Preparation of Negative Electrode, long-rectangular protrusions were formed on each of the surfaces of the electrolytic copper foil as in Example 1, except that the protrusions were arranged as illustrated in FIG. 8. A lithium secondary battery was prepared as in Example 1, except that the negative electrode prepared in Example 8 was used.

The distance between each pair of the protrusions 341 adjacent to each other in the third longitudinal direction C was 2 mm (see P in FIG. 8). The minimum distance between each pair of the virtual straight lines adjacent to each other was 4 mm (see P3 in FIG. 8). The maximum width $D_{max}$ of each of the protrusions 341 was 500 mm. The minimum width $D_{min}$ of each of the protrusions 341 was 1 mm. Note that, FIG. 8 illustrates only a part of the electrolytic copper foil including the long-rectangular protrusions formed on both surfaces thereof, which had an overall width of 65 mm and an overall length of 1000 mm in the longitudinal direction.

Example 9

In (2) Preparation of Negative Electrode, long-rectangular protrusions were formed on each of the surfaces of the electrolytic copper foil as in Example 1, except that the protrusions were arranged as illustrated in FIG. 9. A lithium secondary battery was prepared as in Example 1, except that the negative electrode prepared in Example 9 was used.

The distance between each pair of the protrusions 341 adjacent to each other in the third longitudinal direction C was 2 mm (see P in FIG. 9). The minimum distance between each pair of the virtual straight lines adjacent to each other was 4 mm (see P3 in FIG. 9). The maximum width $D_{max}$ of each of the protrusions 341 was 500 mm. The minimum width $D_{min}$ of each of the protrusions 341 was 1 mm. Note that, FIG. 9 illustrates only a part of the electrolytic copper foil including the long-rectangular protrusions formed on both surfaces thereof, which had an overall width of 65 mm and an overall length of 1000 mm in the longitudinal direction.

Comparative Example 1

Figure 13:
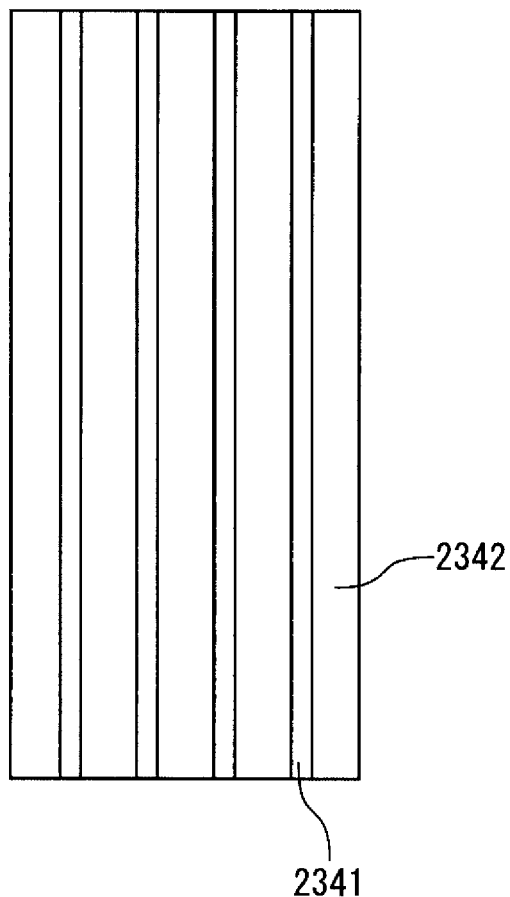
FIG. 13 is a schematic top plan view of a negative electrode current collector prepared in Comparative example 1.

In (2) Preparation of Negative Electrode, line-like protrusions 2341 were formed on each of the surfaces of an electrolytic copper foil 2342 as in Example 1, except that the protrusions were arranged as illustrated in FIG. 13. Each of the protrusions 2341 connected the short sides of the negative electrode current collector prepared in Comparative example 1 to each other. The longitudinal direction of each of the protrusions 2341 was the same as that of the electrolytic copper foil 2342. The minimum width of each of the protrusions 2341 was 1 mm. The minimum distance between the center lines of each pair of the protrusions 2341 adjacent to each other was 4 mm. A lithium secondary battery was prepared as in Example 1, except that the negative electrode prepared in Comparative example 1 was used.

Comparative Example 2

Figure 14:
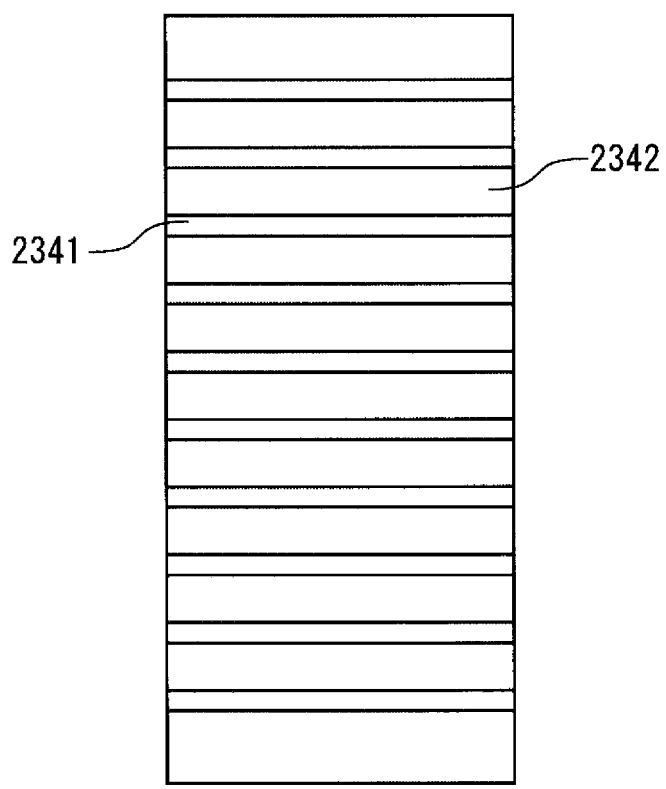
FIG. 14 is a schematic top plan view of a negative electrode current collector prepared in Comparative example 2.

In (2) Preparation of Negative Electrode, line-like protrusions 2341 were formed on each of the surfaces of an electrolytic copper foil 2342 as in Example 1, except that the protrusions were arranged as illustrated in FIG. 14. Each of the protrusions 2341 connected the long sides of the negative electrode current collector prepared in Comparative example 2 to each other. The longitudinal direction of each of the protrusions 2341 was the same as the lateral direction of the electrolytic copper foil 2342. The minimum width of each of the protrusions 2341 was 1 mm. The minimum distance between the center lines of each pair of the protrusions 2341 adjacent to each other was 4 mm. A lithium secondary battery was prepared as in Example 1, except that the negative electrode prepared in Comparative example 2 was used.

Evaluations

Each of the batteries was subjected to a charge/discharge test in order to determine the charge/discharge characteristics of the battery. In the charge/discharge test, the batteries were charged under the following conditions and subsequently, after an interval of 20 minutes, discharged under the following conditions in a thermostat set at 25° C. Table 1 summarizes the evaluation results.

Charge

Each of the batteries was charged with a constant current of 10 mA per unit area (square centimeters) of the electrodes until the battery voltage reached 4.3 V and subsequently charged with a constant voltage of 4.3 V until the current per unit area of the electrodes reached 1 mA.

Discharge

Each of the batteries was discharged with a constant current of 10 mA per unit area of the electrodes until the battery voltage reached 2.5 V.

The above charge and discharge were considered as one cycle. The batteries were subjected to ten cycles of charge and discharge. The capacity retention rate (%) of each of the batteries was determined by dividing the discharge capacity of the battery measured in the tenth cycle by the discharge capacity of the battery measured in the first cycle.

In the other test, after the batteries had been charged in the second cycle, the batteries were disassembled and the negative electrode was taken from each of the batteries. The batteries were disassembled in an inert gas atmosphere. After the negative electrodes had been cleaned with DMC and then dried, the thicknesses of the negative electrodes were measured. The thickness of each of the negative electrodes was determined by measuring the thickness of the negative electrode at five random positions with a PEACOCK Digital Thickness Gauge G2-205M and taking the average. The ratio (%) of the thickness of the negative electrode measured in the second cycle to the thickness (100%) of the current collector of the negative electrode which was measured before the charge and discharge was determined as an expansion of the negative electrode. Table 1 summarizes the evaluation results.

TABLE 1

|  | Arrangement of protrusions | Expansion of negative electrode (%) | Capacity retention rate (%) |
|---|---|---|---|
| Example 1 | FIG. 1 | 115 | 98.1 |
| Example 2 | FIG. 2 | 118 | 97.2 |
| Example 3 | FIG. 3 | 117 | 97.4 |
| Example 4 | FIG. 4 | 116 | 97.6 |
| Example 5 | FIG. 5 | 117 | 97.3 |
| Example 6 | FIG. 6 | 118 | 96.1 |
| Example 7 | FIG. 7 | 117 | 96.0 |
| Example 8 | FIG. 8 | 117 | 95.2 |
| Example 9 | FIG. 9 | 118 | 95.3 |

TABLE 1-continued

| | Arrangement of protrusions | Expansion of negative electrode (%) | Capacity retention rate (%) |
|---|---|---|---|
| Comparative example 1 | FIG. 13 | 122 | 94.8 |
| Comparative example 2 | FIG. 14 | 121 | 94.9 |

The results described in Table 1 confirm that the expansion of the negative electrode of each of the batteries prepared in Examples 1 to 9 was smaller than that of the negative electrode of any of the batteries prepared in Comparative examples 1 and 2. Furthermore, the batteries prepared in Examples 1 to 9 had a higher capacity retention rate than any of the batteries prepared in Comparative examples 1 and 2. This is presumably because arranging the protrusions so as not to divide the first surface of the negative electrode current collector into parts reduced the likelihood of the protrusions blocking the movement of the nonaqueous electrolyte which occurs with the deposition and dissolution of lithium metal and the likelihood of the reaction unevenly occurring on the negative electrode current collector.

In particular, the batteries prepared in Examples 1 to 5 had a markedly higher capacity retention rate than any of the batteries prepared in Examples 6 to 9. This is presumably because arranging protrusions having different longitudinal directions enabled the nonaqueous electrolyte to move in a random manner and further reduced the uneven distribution of the nonaqueous electrolyte.

Since the lithium secondary battery according to the above-described embodiment of the present disclosure may reduce the expansion of the electrode, have a large discharge capacity, and be excellent in terms of safety, it may be used in, for example, electronic devices, such as mobile phones, smartphones, and tablet terminals; electric vehicles, such as hybrid electric vehicles and plug-in hybrid electric vehicles; and home storage batteries used in combination with solar batteries.

What is claimed is:

1. A lithium secondary battery comprising:
a positive electrode containing a positive electrode active material containing lithium;
a negative electrode facing the positive electrode;
a separator disposed between the positive and negative electrodes; and
a nonaqueous electrolyte having lithium-ion conductivity, wherein:
the negative electrode includes a negative electrode current collector,
the negative electrode current collector includes:
a layer having a first surface; and
protrusions protruding from the first surface,
the first surface is a surface on which lithium metal is deposited during charge,
any of the protrusions does not connect opposite outer edges of the negative electrode current collector so that the protrusions do not divide the first surface into parts, and
on the first surface, the ratio $(A_{r1}/A_1) \times 100\%$ is 0.2% or more and 70% or less, where $A_{r1}$ is a total area of the first protrusions, and $A_1$ is an area of the first surface.

2. A lithium secondary battery comprising:
a positive electrode containing a positive electrode active material containing lithium;
a negative electrode facing the positive electrode;
a separator disposed between the positive and negative electrodes; and
a nonaqueous electrolyte having lithium-ion conductivity, wherein:
the negative electrode includes a negative electrode current collector,
the negative electrode current collector includes:
a layer having a first surface; and
protrusions protruding from the first surface,
the first surface is a surface on which lithium metal is deposited during charge,
any of the protrusions does not connect opposite outer edges of the negative electrode current collector so that the protrusions do not divide the first surface into parts, and
the average height of the protrusions above the first surface is 15 μm or more and 120 μm or less.

3. A lithium secondary battery comprising:
a positive electrode containing a positive electrode active material containing lithium;
a negative electrode facing the positive electrode;
a separator disposed between the positive and negative electrodes; and
a nonaqueous electrolyte having lithium-ion conductivity, wherein:
the negative electrode includes a negative electrode current collector,
the negative electrode current collector includes:
a layer having a first surface; and
protrusions protruding from the first surface,
the first surface is a surface on which lithium metal is deposited during charge,
any of the protrusions does not connect opposite outer edges of the negative electrode current collector so that the protrusions do not divide the first surface into parts,
the nonaqueous electrolyte includes lithium ions and anions, and
the anions include at least one type of anion selected from the group consisting of $PF_6^-$, anions of imides, and anions of oxalates.

4. A lithium secondary battery comprising:
a positive electrode containing a positive electrode active material containing lithium;
a negative electrode facing the positive electrode;
a separator disposed between the positive and negative electrodes; and
a nonaqueous electrolyte having lithium-ion conductivity, wherein:
the negative electrode includes a negative electrode current collector,
the negative electrode current collector includes:
a layer having a first surface; and
protrusions protruding from the first surface,
the first surface is a surface on which lithium metal is deposited during charge,
any of the protrusions does not connect opposite outer edges of the negative electrode current collector so that the protrusions do not divide the first surface into parts, and
the protrusions are composed of a material different from a material of which the layer is composed.

5. A lithium secondary battery comprising:
a positive electrode containing a positive electrode active material containing lithium;
a negative electrode facing the positive electrode;
a separator disposed between the positive and negative electrodes; and a nonaqueous electrolyte having lithium-ion conductivity, wherein:

the negative electrode includes a negative electrode current collector, the negative electrode current collector includes:
  a layer having a first surface; and
  protrusions protruding from the first surface, the first surface is a surface on which lithium metal is deposited during charge, any of the protrusions does not connect opposite outer edges of the negative electrode current collector so that the protrusions do not divide the first surface into parts, and the protrusions are composed of a resin material.

6. A lithium secondary battery comprising:

a positive electrode containing a positive electrode active material containing lithium;

a negative electrode facing the positive electrode;

a separator disposed between the positive and negative electrodes; and a nonaqueous electrolyte having lithium-ion conductivity, wherein:

the negative electrode includes a negative electrode current collector, the negative electrode current collector includes:
  a layer having a first surface; and
  protrusions protruding from the first surface, the first surface is a surface on which lithium metal is deposited during charge, any of the protrusions does not connect opposite outer edges of the negative electrode current collector so that the protrusions do not divide the first surface into parts, and the layer and the protrusions are formed in one piece using the same material.

* * * * *